(12) United States Patent
Chen et al.

(10) Patent No.: US 10,926,221 B2
(45) Date of Patent: *Feb. 23, 2021

(54) SINGLE BRICK SCR/ASC/PNA/DOC CLOSE-COUPLED CATALYST

(71) Applicant: JOHNSON MATTHEY PUBLIC LIMITED COMPANY, London (GB)

(72) Inventors: Hai-Ying Chen, Wayne, PA (US); Joseph Michael Fedeyko, Wayne, PA (US); Dongxia Liu, Wayne, PA (US); Jing Lu, Wayne, PA (US)

(73) Assignee: Johnson Matthey Public Limited Company, London (GB)

(*) Notice: Subject to any disclaimer, the term of this patent is extended or adjusted under 35 U.S.C. 154(b) by 135 days.

This patent is subject to a terminal disclaimer.

(21) Appl. No.: 15/939,369

(22) Filed: Mar. 29, 2018

(65) Prior Publication Data

US 2019/0001268 A1  Jan. 3, 2019

Related U.S. Application Data

(60) Provisional application No. 62/478,824, filed on Mar. 30, 2017.

(51) Int. Cl.
*B01D 53/94* (2006.01)
*F01N 3/035* (2006.01)
(Continued)

(52) U.S. Cl.
CPC ....... *B01D 53/9418* (2013.01); *B01D 53/944* (2013.01); *B01D 53/9436* (2013.01); *B01D 53/9472* (2013.01); *B01D 53/9481* (2013.01); *B01J 29/72* (2013.01); *B01J 29/74* (2013.01); *B01J 29/80* (2013.01); *B01J 35/0006* (2013.01);
(Continued)

(58) Field of Classification Search
CPC ... B01J 29/72; B01J 29/74; B01J 29/80; B01J 35/0006; B01J 35/04; B01D 53/9418; B01D 53/9436; B01D 53/944; B01D 53/9472; B01D 53/9481; F01N 3/035; F01N 3/0814; F01N 3/0842; F01N 3/103; F01N 3/106; F01N 3/2066; F01N 3/2828
See application file for complete search history.

(56) References Cited

U.S. PATENT DOCUMENTS 9,579,603 B2 * 2/2017 Sonntag .................. B01J 21/06
9,579,638 B2 * 2/2017 Fedeyko .............. B01J 37/0248
(Continued)

FOREIGN PATENT DOCUMENTS

WO  WO-2016203249 A1  12/2016
WO  WO-2018081682 A1  5/2018

*Primary Examiner* — Cam N. Nguyen

(57) ABSTRACT

A catalyst article including a substrate with an inlet side and an outlet side, a first zone and a second zone, where the first zone includes a passive NOx adsorber (PNA), and an ammonia slip catalyst (ASC) comprising a platinum group metal on a support and a first SCR catalyst; where the second zone includes a catalyst selected from the group consisting of a diesel oxidation catalyst (DOC) and a diesel exotherm catalyst (DEC); and where the first zone is located upstream of the second zone. The first zone may include a bottom layer with a blend of: (1) the platinum group metal on a support and (2) the first SCR catalyst; and a top layer with a second SCR catalyst, the top layer located over the bottom layer.

24 Claims, 29 Drawing Sheets

1a

1b

1c

(51) Int. Cl.
   *F01N 3/08* (2006.01)
   *F01N 3/10* (2006.01)
   *F01N 3/20* (2006.01)
   *F01N 3/28* (2006.01)
   *B01J 29/72* (2006.01)
   *B01J 29/74* (2006.01)
   *B01J 29/80* (2006.01)
   *B01J 35/00* (2006.01)
   *B01J 35/04* (2006.01)
   *B01J 37/02* (2006.01)

(52) U.S. Cl.
   CPC ........... *B01J 35/04* (2013.01); *B01J 37/0244* (2013.01); *B01J 37/0246* (2013.01); *B01J 37/0248* (2013.01); *F01N 3/035* (2013.01); *F01N 3/0814* (2013.01); *F01N 3/0842* (2013.01); *F01N 3/103* (2013.01); *F01N 3/106* (2013.01); *F01N 3/2066* (2013.01); *F01N 3/2828* (2013.01); *B01D 2255/1021* (2013.01); *B01D 2255/1023* (2013.01); *B01D 2255/2073* (2013.01); *B01D 2255/20738* (2013.01); *B01D 2255/20761* (2013.01); *B01D 2255/30* (2013.01); *B01D 2255/50* (2013.01); *B01D 2255/9022* (2013.01); *B01D 2255/9032* (2013.01); *B01D 2255/91* (2013.01); *F01N 2250/02* (2013.01); *F01N 2250/12* (2013.01); *F01N 2250/14* (2013.01); *F01N 2330/06* (2013.01); *F01N 2330/30* (2013.01); *F01N 2330/60* (2013.01); *F01N 2370/04* (2013.01); *F01N 2510/063* (2013.01); *F01N 2510/0682* (2013.01); *F01N 2510/0684* (2013.01); *Y02C 20/10* (2013.01); *Y02T 10/12* (2013.01)

(56) References Cited

U.S. PATENT DOCUMENTS

| | | | |
|---|---|---|---|
| 9,597,636 B2* | 3/2017 | Sonntag | F01N 3/035 |
| 9,751,080 B2* | 9/2017 | Fedeyko | B01J 29/74 |
| 9,789,441 B2* | 10/2017 | Larsson | B01J 29/06 |
| 9,878,287 B2* | 1/2018 | Lu | B01J 29/80 |
| 9,878,636 B2* | 1/2018 | Irvin, Sr. | B60L 13/04 |
| 9,937,489 B2* | 4/2018 | Larsson | B01D 53/9436 |
| 9,993,772 B2* | 6/2018 | Gilbert | F01N 3/2066 |
| 10,201,807 B2* | 2/2019 | Larsson | B01J 35/04 |
| 10,500,571 B2* | 12/2019 | Greenham | B01J 37/08 |
| 10,500,574 B2* | 12/2019 | Fedeyko | B01J 35/0006 |
| 2010/0175372 A1 | 7/2010 | Lambert et al. | |
| 2016/0045868 A1* | 2/2016 | Sonntag | B01J 23/22 423/213.2 |
| 2016/0367938 A1* | 12/2016 | Larsson | B01J 29/80 |
| 2016/0367941 A1* | 12/2016 | Gilbert | B01D 53/9436 |
| 2016/0367973 A1 | 12/2016 | Larsson et al. | |
| 2016/0367975 A1* | 12/2016 | Lu | B01J 37/0244 |
| 2017/0095805 A1* | 4/2017 | Chiffey | B01J 35/02 |
| 2017/0209857 A1 | 7/2017 | Chandler et al. | |
| 2018/0045097 A1* | 2/2018 | Tang | B01J 35/0006 |
| 2018/0078926 A1* | 3/2018 | Chen | F01N 3/106 |
| 2018/0111086 A1* | 4/2018 | Chen | F01N 3/2066 |
| 2018/0111088 A1* | 4/2018 | Li | B01J 37/0244 |
| 2018/0221860 A1* | 8/2018 | Larsson | B01J 37/0244 |
| 2018/0280876 A1* | 10/2018 | Chen | B01J 23/6527 |
| 2018/0280877 A1* | 10/2018 | Chen | B01J 23/6482 |
| 2018/0283250 A1* | 10/2018 | Chen | F01N 3/0842 |
| 2019/0001268 A1* | 1/2019 | Chen | F01N 3/0814 |
| 2019/0168198 A1* | 6/2019 | Larsson | B01D 53/9436 |

* cited by examiner

45a

45b

45c

45d

- ANR=0.6 SCR + DOC
- ANR=1.2 SCR + DOC
- ANR=0.6 Ref. ASC/DOC
- ANR=1.2 Ref. ASC/DOC
- ANR=0.6 Blend ASC/DOC
- ANR=1.2 Blend ASC/DOC
- ANR=0.6 PNA/SCR/ASC/DOC
- ANR=1.2 PNA/SCR/ASC/DOC

SINGLE BRICK SCR/ASC/PNA/DOC CLOSE-COUPLED CATALYST

BACKGROUND OF THE INVENTION

Combustion of hydrocarbon-based fuel in engines produces exhaust gas that contains, in large part, relatively benign nitrogen ($N_2$), water vapor ($H_2O$), and carbon dioxide ($CO_2$). But the exhaust gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically exhaust gases from lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO) and nitrogen dioxide ($NO_2$). The reduction of NO to $N_2$ is particularly problematic because the exhaust gas contains enough oxygen to favor oxidative reactions instead of reduction. Notwithstanding, NO can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is adsorbed onto the catalyst and the $NO_x$ reduction reaction takes place as the gases pass through or over the catalyzed substrate. The chemical equation for stoichiometric SCR reactions using ammonia is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

$NH_3$ SCR emission control systems are very efficient once they reach their operating temperature (typically, 200° C. and higher). However, these systems are relatively inefficient below their operating temperature (the "cold start" period). As even more stringent national and regional legislation lowers the amount of pollutants that can be emitted from diesel engines, reducing emissions during the cold start period is becoming a major challenge. Thus, catalysts and methods for reducing the level of $NO_x$ emitted during cold start condition continue to be explored. The present invention addresses this issue by combining a passive $NO_X$ adsorber catalyst which can trap $NO_X$ at low temperature with an $NH_3$ SCR catalyst. The PNA can provide the additional benefit of assisting with controlling $NH_3$ slip as well as CO and HC emission.

SUMMARY OF THE INVENTION

According to some embodiments of the present invention, a catalyst article includes a substrate with an inlet side and an outlet side, a first zone and a second zone, where the first zone comprises a passive NOx adsorber (PNA), and an ammonia slip catalyst (ASC) comprising a platinum group metal on a support and a first SCR catalyst; where the second zone comprises a catalyst selected from the group consisting of a diesel oxidation catalyst (DOC) and a diesel exotherm catalyst (DEC); and where the first zone is located upstream of the second zone. The first zone may include a bottom layer with a blend of: (1) the platinum group metal on a support and (2) the first SCR catalyst; and a top layer including a second SCR catalyst, the top layer located over the bottom layer.

The support may include a siliceous material, such as a material selected from the group consisting of: (1) silica and (2) a zeolite with a silica-to-alumina ratio higher than 200. In some embodiments, the platinum group metal is present on the support in an amount of about 0.5 wt % to about 10 wt %; about 1 wt % to about 6 wt %; or about 1.5 wt % to about 4 wt % of the total weight of the platinum group metal and the support. The platinum group metal may include platinum, palladium or a combination of platinum and palladium. In some embodiments, the platinum group metal comprises platinum.

In some embodiments, within the blend, a weight ratio of the first SCR catalyst to the platinum group metal on a support is about 3:1 to about 300:1; about 5:1 to about 100:1; or about 10:1 to about 50:1. The first and/or second SCR catalyst may include a base metal, an oxide of a base metal, a molecular sieve, a metal exchanged molecular sieve or a mixture thereof. In some embodiments, the first and/or second SCR catalyst comprises copper, iron, manganese, palladium, or combinations thereof.

In some embodiments, the first SCR catalyst and the PNA are present in a ratio of 5:1 to 1:5; 3:1 to 1:3; or 2:1 to 1:2. In some embodiments, the PNA and the first SCR catalyst may have a common formulation. In some embodiments, the PNA and the first SCR catalyst comprise a same material. The PNA may comprise, for example, a platinum group metal on a molecular sieve. In some embodiments, the PNA further comprises a base metal. In some embodiments, the PNA comprises Pd on a zeolite.

In some embodiments, the bottom layer further comprises the PNA. The bottom layer may include a section comprising the PNA ("PNA section"), and the PNA section is located upstream of the blend. The blend may further comprise the PNA. In some embodiments, the bottom layer comprises a section comprising the PNA and a third SCR catalyst ("PNA/SCR section"). In some embodiments, the bottom layer includes the PNA/SCR section and the blend, with the PNA/SCR section located upstream of the blend. In some embodiments, the bottom layer comprises the PNA/SCR section and the blend, with the blend located on top of the PNA/SCR section. In some embodiments, the bottom layer comprises the PNA/SCR section and the blend, with the PNA/SCR section located on top of the blend.

In some embodiments, the first zone and the second zone are located on a single substrate and the first zone is located on the inlet side of the substrate and the second zone is located on the outlet side of the substrate. In some embodiments, the substrate comprises a first substrate and a second substrate, where the first zone is located on the first substrate and the second zone is located on the second substrate and the first substrate is located upstream of the second substrate.

According to some embodiments of the present invention, a method of reducing emissions from an exhaust stream includes contacting the exhaust stream with catalyst article including a substrate with an inlet side and an outlet side, a first zone and a second zone, where the first zone includes a passive NOx adsorber (PNA), and an ammonia slip catalyst (ASC) comprising a platinum group metal on a support and a first SCR catalyst; where the second zone comprises a catalyst selected from the group consisting of a diesel oxidation catalyst (DOC) and a diesel exotherm catalyst (DEC); and where the first zone is located upstream of the second zone. The first zone may include a bottom layer with a blend of: (1) the platinum group metal on a support and (2) the first SCR catalyst; and a top layer including a second SCR catalyst, the top layer located over the bottom layer.

The support may include a siliceous material, such as a material selected from the group consisting of: (1) silica and (2) a zeolite with a silica-to-alumina ratio higher than 200. In some embodiments, the platinum group metal is present on the support in an amount of about 0.5 wt % to about 10 wt %; about 1 wt % to about 6 wt %; or about 1.5 wt % to about 4 wt % of the total weight of the platinum group metal and the support. The platinum group metal may include platinum, palladium or a combination of platinum and palladium. In some embodiments, the platinum group metal comprises platinum.

In some embodiments, within the blend, a weight ratio of the first SCR catalyst to the platinum group metal on a support is about 3:1 to about 300:1; about 5:1 to about 100:1; or about 10:1 to about 50:1. The first and/or second SCR catalyst may include a base metal, an oxide of a base metal, a molecular sieve, a metal exchanged molecular sieve or a mixture thereof. In some embodiments, the first and/or second SCR catalyst comprises copper, iron, manganese, palladium, or combinations thereof.

In some embodiments, the first SCR catalyst and the PNA are present in a ratio of 5:1 to 1:5; 3:1 to 1:3; or 2:1 to 1:2. In some embodiments, the PNA and the first SCR catalyst may have a common formulation. In some embodiments, the PNA and the first SCR catalyst comprise a same material. The PNA may comprise, for example, a platinum group metal on a molecular sieve. In some embodiments, the PNA further comprises a base metal. In some embodiments, the PNA comprises Pd on a zeolite.

In some embodiments, the bottom layer further comprises the PNA. The bottom layer may include a section comprising the PNA ("PNA section"), and the PNA section is located upstream of the blend. The blend may further comprise the PNA. In some embodiments, the bottom layer comprises a section comprising the PNA and a third SCR catalyst ("PNA/SCR section"). In some embodiments, the bottom layer includes the PNA/SCR section and the blend, with the PNA/SCR section located upstream of the blend. In some embodiments, the bottom layer comprises the PNA/SCR section and the blend, with the blend located on top of the PNA/SCR section. In some embodiments, the bottom layer comprises the PNA/SCR section and the blend, with the PNA/SCR section located on top of the blend.

In some embodiments, the first zone and the second zone are located on a single substrate and the first zone is located on the inlet side of the substrate and the second zone is located on the outlet side of the substrate. In some embodiments, the substrate comprises a first substrate and a second substrate, where the first zone is located on the first substrate and the second zone is located on the second substrate and the first substrate is located upstream of the second substrate.

In some embodiments, the exhaust stream comprises an ammonia:NOx ratio of ≥1 when a temperature of the exhaust stream entering the catalyst article is ≤180° C. In some embodiments, the exhaust stream comprises an ammonia:NOx ratio of >0.5 when a temperature of the exhaust stream entering the catalyst article is ≥180° C.

According to some embodiments of the present invention, a catalyst article includes a substrate with an inlet end and an outlet end, a first zone, a second zone, and a third zone, where the first zone includes a second SCR catalyst; where the second zone includes an ammonia slip catalyst (ASC) comprising a blend of: (1) a platinum group metal on a support and (2) a first SCR catalyst; where the third zone includes a catalyst ("third zone catalyst") selected from the group consisting of a diesel oxidation catalyst (DOC) and a diesel exotherm catalyst (DEC); where the first zone is located upstream of the second zone, and the second zone is located upstream of the third zone; and where the catalyst article comprises a passive NOx adsorber ("PNA"). In some embodiments, the first zone and/or the second zone comprises the PNA. In some embodiments, the ASC is included in a first layer; the third zone catalyst is included in a second layer which extends from the outlet end to less than a total length of the substrate, where the second layer is located on top of the first layer and is shorter in length than the first layer; and the second SCR catalyst is included in a layer which extends from the inlet end to less than a total length of the substrate, and which at least partially overlaps the first layer. In some embodiments, the first layer extends from the outlet end to less than a total length of the substrate. In some embodiments, first layer extends from the inlet end to less than a total length of the substrate. In some embodiments, the first layer extends the length of the substrate. In some embodiments, the first layer covers the length of the first zone and the second zone.

In some embodiments, the first layer further includes the PNA. The first layer may include a section comprising the PNA ("PNA section"), and the PNA section may be located upstream of the blend. In some embodiments, the blend further comprises the PNA. In some embodiments, the first layer includes a section comprising the PNA and a third SCR catalyst ("PNA/SCR section"). In some embodiments, the first layer includes the PNA/SCR section and the blend, with the PNA/SCR layer located upstream of the blend. In some embodiments, the first layer includes the PNA/SCR section, with the blend located on top of the PNA/SCR section. In some embodiments, the first layer includes the blend, with the PNA/SCR section located on top of the blend.

The support may include a siliceous material, such as a material selected from the group consisting of: (1) silica and (2) a zeolite with a silica-to-alumina ratio higher than 200. In some embodiments, the platinum group metal is present on the support in an amount of about 0.5 wt % to about 10 wt %; about 1 wt % to about 6 wt %; or about 1.5 wt % to about 4 wt % of the total weight of the platinum group metal and the support. The platinum group metal may include platinum, palladium or a combination of platinum and palladium. In some embodiments, the platinum group metal comprises platinum.

In some embodiments, within the blend, a weight ratio of the first SCR catalyst to the platinum group metal on a support is about 3:1 to about 300:1; about 5:1 to about 100:1; or about 10:1 to about 50:1. The first and/or second SCR catalyst may include a base metal, an oxide of a base metal, a molecular sieve, a metal exchanged molecular sieve or a mixture thereof. In some embodiments, the first and/or second SCR catalyst comprises copper, iron, manganese, palladium, or combinations thereof.

In some embodiments, the first SCR catalyst and the PNA are present in a ratio of 5:1 to 1:5; 3:1 to 1:3; or 2:1 to 1:2. In some embodiments, the PNA and the first SCR catalyst may have a common formulation. In some embodiments, the PNA and the first SCR catalyst comprise a same material.

The PNA may comprise, for example, a platinum group metal on a molecular sieve. In some embodiments, the PNA further comprises a base metal. In some embodiments, the PNA comprises Pd on a zeolite.

According to some embodiments of the present invention, a method of reducing emissions from an exhaust stream includes contacting the exhaust stream with a catalyst article including a substrate with an inlet end and an outlet end, a first zone, a second zone, and a third zone, where the first zone includes a second SCR catalyst; where the second zone includes an ammonia slip catalyst (ASC) comprising a blend of: (1) a platinum group metal on a support and (2) a first SCR catalyst; where the third zone includes a catalyst ("third zone catalyst") selected from the group consisting of a diesel oxidation catalyst (DOC) and a diesel exotherm catalyst (DEC); where the first zone is located upstream of the second zone, and the second zone is located upstream of the third zone; and where the catalyst article comprises a passive NOx adsorber ("PNA"). In some embodiments, the first zone and/or the second zone comprises the PNA. In some embodiments, the ASC is included in a first layer; the third zone catalyst is included in a second layer which extends from the outlet end to less than a total length of the substrate, where the second layer is located on top of the first layer and is shorter in length than the first layer; and the second SCR catalyst is included in a layer which extends from the inlet end to less than a total length of the substrate, and which at least partially overlaps the first layer. In some embodiments, the first layer extends from the outlet end to less than a total length of the substrate. In some embodiments, first layer extends from the inlet end to less than a total length of the substrate. In some embodiments, the first layer extends the length of the substrate. In some embodiments, the first layer covers the length of the first zone and the second zone.

In some embodiments, the first layer further includes the PNA. The first layer may include a section comprising the PNA ("PNA section"), and the PNA section may be located upstream of the blend. In some embodiments, the blend further comprises the PNA. In some embodiments, the first layer includes a section comprising the PNA and a third SCR catalyst ("PNA/SCR section"). In some embodiments, the first layer includes the PNA/SCR section and the blend, with the PNA/SCR layer located upstream of the blend. In some embodiments, the first layer includes the PNA/SCR section, with the blend located on top of the PNA/SCR section. In some embodiments, the first layer includes the blend, with the PNA/SCR section located on top of the blend.

The support may include a siliceous material, such as a material selected from the group consisting of: (1) silica and (2) a zeolite with a silica-to-alumina ratio higher than 200. In some embodiments, the platinum group metal is present on the support in an amount of about 0.5 wt % to about 10 wt %; about 1 wt % to about 6 wt %; or about 1.5 wt % to about 4 wt % of the total weight of the platinum group metal and the support. The platinum group metal may include platinum, palladium or a combination of platinum and palladium. In some embodiments, the platinum group metal comprises platinum.

In some embodiments, within the blend, a weight ratio of the first SCR catalyst to the platinum group metal on a support is about 3:1 to about 300:1; about 5:1 to about 100:1; or about 10:1 to about 50:1. The first and/or second SCR catalyst may include a base metal, an oxide of a base metal, a molecular sieve, a metal exchanged molecular sieve or a mixture thereof. In some embodiments, the first and/or second SCR catalyst comprises copper, iron, manganese, palladium, or combinations thereof.

In some embodiments, the first SCR catalyst and the PNA are present in a ratio of 5:1 to 1:5; 3:1 to 1:3; or 2:1 to 1:2. In some embodiments, the PNA and the first SCR catalyst may have a common formulation. In some embodiments, the PNA and the first SCR catalyst comprise a same material. The PNA may comprise, for example, a platinum group metal on a molecular sieve. In some embodiments, the PNA further comprises a base metal. In some embodiments, the PNA comprises Pd on a zeolite.

In some embodiments, the exhaust stream comprises an ammonia:NOx ratio of ≥1 when a temperature of the exhaust stream entering the catalyst article is ≤180° C. In some embodiments, the exhaust stream comprises an ammonia:NOx ratio of >0.5 when a temperature of the exhaust stream entering the catalyst article is ≥180° C.

According to some embodiments of the present invention, an exhaust purification system for reduction of emissions from an exhaust stream includes in order: a third SCR catalyst; and a catalyst article including a substrate with an inlet side and an outlet side, a first zone and a second zone, where the first zone comprises a passive NOx adsorber (PNA), and an ammonia slip catalyst (ASC) comprising a platinum group metal on a support and a first SCR catalyst; where the second zone comprises a catalyst selected from the group consisting of a diesel oxidation catalyst (DOC) and a diesel exotherm catalyst (DEC); and where the first zone is located upstream of the second zone. The first zone may include a bottom layer with a blend of: (1) the platinum group metal on a support and (2) the first SCR catalyst; and a top layer including a second SCR catalyst, the top layer located over the bottom layer.

In some embodiments, the third SCR catalyst and the catalyst article are located on a single substrate, with the third SCR catalyst located upstream of the first zone and the second zone. In some embodiments, the third SCR catalyst is located on a substrate upstream of the catalyst article substrate. In some embodiments, the third SCR catalyst is close-coupled with the catalyst article. The system may further include a filter. In some embodiments, the system includes a downstream SCR catalyst, located downstream from the catalyst article. In some embodiments, the system includes a reductant injector located upstream of the third SCR catalyst and/or a reductant injector located upstream of the downstream SCR catalyst.

The support may include a siliceous material, such as a material selected from the group consisting of: (1) silica and (2) a zeolite with a silica-to-alumina ratio higher than 200. In some embodiments, the platinum group metal is present on the support in an amount of about 0.5 wt % to about 10 wt %; about 1 wt % to about 6 wt %; or about 1.5 wt % to about 4 wt % of the total weight of the platinum group metal and the support. The platinum group metal may include platinum, palladium or a combination of platinum and palladium. In some embodiments, the platinum group metal comprises platinum.

In some embodiments, within the blend, a weight ratio of the first SCR catalyst to the platinum group metal on a support is about 3:1 to about 300:1; about 5:1 to about 100:1; or about 10:1 to about 50:1. The first and/or second SCR catalyst may include a base metal, an oxide of a base metal, a molecular sieve, a metal exchanged molecular sieve or a mixture thereof. In some embodiments, the first and/or second SCR catalyst comprises copper, iron, manganese, palladium, or combinations thereof.

In some embodiments, the first SCR catalyst and the PNA are present in a ratio of 5:1 to 1:5; 3:1 to 1:3; or 2:1 to 1:2. In some embodiments, the PNA and the first SCR catalyst may have a common formulation. In some embodiments, the PNA and the first SCR catalyst comprise a same material. The PNA may comprise, for example, a platinum group metal on a molecular sieve. In some embodiments, the PNA further comprises a base metal. In some embodiments, the PNA comprises Pd on a zeolite.

In some embodiments, the bottom layer further comprises the PNA. The bottom layer may include a section comprising the PNA ("PNA section"), and the PNA section is located upstream of the blend. The blend may further comprise the PNA. In some embodiments, the bottom layer comprises a section comprising the PNA and a third SCR catalyst ("PNA/SCR section"). In some embodiments, the bottom layer includes the PNA/SCR section and the blend, with the PNA/SCR section located upstream of the blend. In some embodiments, the bottom layer comprises the PNA/SCR section and the blend, with the blend located on top of the PNA/SCR section. In some embodiments, the bottom layer comprises the PNA/SCR section and the blend, with the PNA/SCR section located on top of the blend.

In some embodiments, the first zone and the second zone are located on a single substrate and the first zone is located on the inlet side of the substrate and the second zone is located on the outlet side of the substrate. In some embodiments, the substrate comprises a first substrate and a second substrate, where the first zone is located on the first substrate and the second zone is located on the second substrate and the first substrate is located upstream of the second substrate.

According to some embodiments of the present invention, an exhaust purification system for reduction of emissions from an exhaust stream includes, in order: a third SCR catalyst; and a catalyst article including a substrate with an inlet end and an outlet end, a first zone, a second zone, and a third zone, where the first zone includes a second SCR catalyst; where the second zone includes an ammonia slip catalyst (ASC) comprising a blend of: (1) a platinum group metal on a support and (2) a first SCR catalyst; where the third zone includes a catalyst ("third zone catalyst") selected from the group consisting of a diesel oxidation catalyst (DOC) and a diesel exotherm catalyst (DEC); where the first zone is located upstream of the second zone, and the second zone is located upstream of the third zone; and where the catalyst article comprises a passive NOx adsorber ("PNA").

In some embodiments, the third SCR catalyst and the catalyst article are located on a single substrate, with the third SCR catalyst located upstream of the first zone, the second zone, and the third zone. In some embodiments, the third SCR catalyst is located on a substrate upstream of the catalyst article substrate. In some embodiments, the third SCR catalyst is close-coupled with the catalyst article. The system may further include a filter. In some embodiments, the system further includes a downstream SCR catalyst, located downstream from the catalyst article. In some embodiments, the system includes a reductant injector located upstream of the third SCR catalyst and/or a reductant injector located upstream of the downstream SCR catalyst.

In some embodiments, the first zone and/or the second zone comprises the PNA. In some embodiments, the ASC is included in a first layer; the third zone catalyst is included in a second layer which extends from the outlet end to less than a total length of the substrate, where the second layer is located on top of the first layer and is shorter in length than the first layer; and the second SCR catalyst is included in a layer which extends from the inlet end to less than a total length of the substrate, and which at least partially overlaps the first layer. In some embodiments, the first layer extends from the outlet end to less than a total length of the substrate.

In some embodiments, first layer extends from the inlet end to less than a total length of the substrate. In some embodiments, the first layer extends the length of the substrate. In some embodiments, the first layer covers the length of the first zone and the second zone.

In some embodiments, the first layer further includes the PNA. The first layer may include a section comprising the PNA ("PNA section"), and the PNA section may be located upstream of the blend. In some embodiments, the blend further comprises the PNA. In some embodiments, the first layer includes a section comprising the PNA and a third SCR catalyst ("PNA/SCR section"). In some embodiments, the first layer includes the PNA/SCR section and the blend, with the PNA/SCR layer located upstream of the blend. In some embodiments, the first layer includes the PNA/SCR section, with the blend located on top of the PNA/SCR section. In some embodiments, the first layer includes the blend, with the PNA/SCR section located on top of the blend.

The support may include a siliceous material, such as a material selected from the group consisting of: (1) silica and (2) a zeolite with a silica-to-alumina ratio higher than 200. In some embodiments, the platinum group metal is present on the support in an amount of about 0.5 wt % to about 10 wt %; about 1 wt % to about 6 wt %; or about 1.5 wt % to about 4 wt % of the total weight of the platinum group metal and the support. The platinum group metal may include platinum, palladium or a combination of platinum and palladium. In some embodiments, the platinum group metal comprises platinum.

In some embodiments, within the blend, a weight ratio of the first SCR catalyst to the platinum group metal on a support is about 3:1 to about 300:1; about 5:1 to about 100:1; or about 10:1 to about 50:1. The first and/or second SCR catalyst may include a base metal, an oxide of a base metal, a molecular sieve, a metal exchanged molecular sieve or a mixture thereof. In some embodiments, the first and/or second SCR catalyst comprises copper, iron, manganese, palladium, or combinations thereof.

In some embodiments, the first SCR catalyst and the PNA are present in a ratio of 5:1 to 1:5; 3:1 to 1:3; or 2:1 to 1:2. In some embodiments, the PNA and the first SCR catalyst may have a common formulation. In some embodiments, the PNA and the first SCR catalyst comprise a same material. The PNA may comprise, for example, a platinum group metal on a molecular sieve. In some embodiments, the PNA further comprises a base metal. In some embodiments, the PNA comprises Pd on a zeolite.

DETAILED DESCRIPTION OF THE INVENTION

Figure 1:
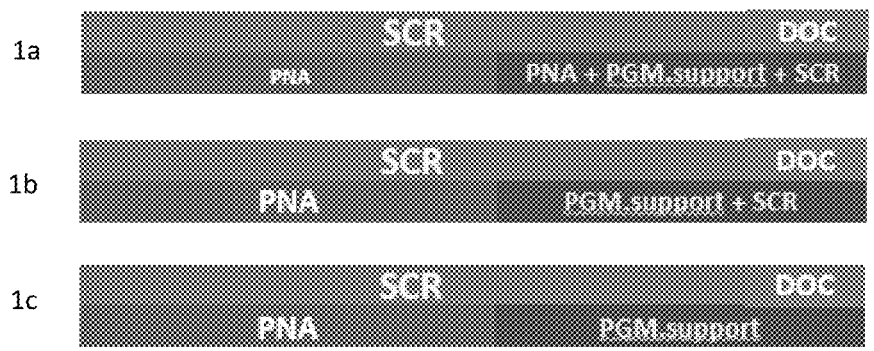
FIGS. 1-44 depict configurations of embodiments of the present invention.

Reduction of NOx from a lean burn diesel engine during engine cold start period is essential for meeting future legislative regulations. One approach to addressing this challenge may relate to a system configured to take advantage of the thermal swing from the engine to reduce the duration of the cold start period. In addition, exhaust gas recirculation circuits may be removed from the engine with such treatment system configurations, allowing for improved fuel economy and engine power output. A challenge for such system design, however, is that the space may be very limited. Therefore, it may be desirable to combine SCR/ASC/DOC functionality into as compact space as possible. However, because the minimal temperature for urea decomposition and for an SCR catalyst to be active is about 180° C. to about 200° C., there may still be a significant gap where the initial cold start emissions is not accounted for. Catalysts, systems, and methods of the present invention have been found to incorporate SCR/ASC/DOC functionalities without compromising NOx conversion and $N_2$ selectivity. In addition, a passive NOx adsorber (PNA) has been incorporated into the SCR/ASC component that may further improve the low temperature cold start performance.

Catalysts, methods, and systems of the present invention relate to catalyst articles including various configurations of SCR catalyst(s), ASC, and DOC or DEC, with a PNA incorporated into the SCR/ASC component(s). The catalysts and specific configurations, methods, and systems are described in further detail below.

Two Zone Configurations

Embodiments of the present invention relate to a catalyst article comprising a substrate with an inlet end and an outlet end, a first zone and a second zone, where the first zone is located upstream of the second zone. The first zone can include a passive NOx adsorber (PNA), and an ammonia slip catalyst (ASC) including a platinum group metal on a support; and an SCR layer having an SCR catalyst, where the SCR layer is located over the ASC bottom layer and a first SCR catalyst. The second zone may include a diesel oxidation catalyst (DOC) or a diesel exotherm catalyst (DEC).

The first zone may include a bottom layer including a blend of the platinum group metal on a support and the first SCR catalyst, and a top layer including a second SCR catalyst, with the top layer located over the bottom layer. PNA may be included in a catalyst article of the present invention in various configurations. For example, in some embodiments, PNA is included in the bottom layer. In some embodiments, PNA is included in the blend of the platinum group metal on a support and the first SCR catalyst. In some embodiments, the bottom layer includes a section comprising the PNA ("PNA section"), and the PNA section is located upstream of the blend. In some embodiments, the bottom layer comprises a section comprising the PNA and a third SCR catalyst ("PNA/SCR section"). The bottom layer may include the PNA/SCR section and the blend, with the PNA/SCR section located upstream of the blend, with the blend located on top of the PNA/SCR section, or with the PNA/SCR section located on top of the blend.

In some embodiments, the first and second zone are located on a single substrate, with the first zone located on the inlet side of the substrate and the second zone located on the outlet side of the substrate. In another embodiment, the first zone is located on a first substrate and the second zone is located on a second substrate, wherein the first substrate is located upstream of the second substrate. The first and second substrate may be close coupled. When the first and second substrate are close coupled, the second substrate may be placed close to and/or directly downstream from the first substrate.

A method of reducing emissions from an exhaust stream may include contacting the exhaust stream with a catalyst article as described herein.

Three Zone Configuration

Embodiments of the present invention relate to catalyst articles having a first zone, a second zone, and a third zone. The first zone may include an SCR catalyst. The second zone may include an ASC having a blend of a platinum group metal on a support and a first SCR catalyst. The third zone may include a catalyst ("third zone catalyst") such as a DOC or DEC. The catalyst article includes a PNA. The first zone is located upstream of the second zone, and the second zone is located upstream of the third zone.

In some embodiments, the ASC is included in a first layer, and the third zone catalyst is included in a second layer which extends from the outlet end to less than a total length of the substrate, where the second layer is located on top of the first layer and is shorter than length than the first layer. The SCR catalyst of the first zone may be included in a layer which extends from the inlet end to less than a total length of the substrate, and which at least partially overlaps the first layer. In various configurations, the first layer may extend from the outlet end to less than a total length of the substrate; the first layer may extend from the inlet end to less than a total length of the substrate; the first layer may extend the length of the substrate; and/or the first layer may cover the length of the first zone, the second zone, and/or the third zone.

In some embodiments, the PNA is included in the first zone. In some embodiments, the PNA is included in the second zone. PNA may be included in a catalyst article of the present invention in various configurations. For example, in some embodiments, PNA is included in the first layer. In some embodiments, PNA is included in the blend of the platinum group metal on a support and the first SCR catalyst. In some embodiments, the first layer includes a section comprising the PNA ("PNA section"), and the PNA section is located upstream of the blend. In some embodiments, the first layer comprises a section comprising the PNA and a third SCR catalyst ("PNA/SCR section"). The first layer may include the PNA/SCR section and the blend, with the PNA/SCR section located upstream of the blend, with the blend located on top of the PNA/SCR section, or with the PNA/SCR section located on top of the blend.

In some embodiments, the first zone is located on a first substrate, the second zone is located on a second substrate, and the third zone is located on a third substrate, where the first substrate is located upstream of the second substrate and the second substrate is located upstream of the third substrate. The first, second, and/or third substrate may be close coupled. When the first, second, and/or third substrate are close coupled, the second substrate may be placed close to and/or directly downstream from the first substrate, and the third substrate may be placed close to and/or directly downstream from the second substrate.

A method of reducing emissions from an exhaust stream may include contacting the exhaust stream with a catalyst article as described herein.

With reference to FIG. 1a, a catalytic article may include a PNA extending from the inlet end toward the outlet end, and a combination of an SCR catalyst, a PNA, and a platinum group metal on a support extending from the outlet end towards the inlet end. A top layer including an SCR catalyst extends from the inlet end towards the outlet end, covering the PNA and partially covering the combination of the SCR catalyst, PNA, and platinum group metal. A DOC layer extends from the outlet end toward the inlet end, partially covering the combination of the SCR catalyst, PNA, and platinum group metal on a support.

With reference to FIG. 1b, a catalytic article may include a PNA extending from the inlet end toward the outlet end, and a combination of an SCR catalyst and a platinum group metal on a support extending from the outlet end towards the inlet end. A top layer including an SCR catalyst extends from the inlet end towards the outlet end, covering the PNA and partially covering the combination of the SCR catalyst and platinum group metal on a support. A DOC layer extends from the outlet end toward the inlet end, partially covering the combination of the SCR catalyst and platinum group metal on a support.

With reference to FIG. 1c, a catalytic article may include a PNA extending from the inlet end toward the outlet end, and a platinum group metal on a support extending from the outlet end towards the inlet end. A top layer including an SCR catalyst extends from the inlet end towards the outlet end, covering the PNA and partially covering the platinum group metal on a support. A DOC layer extends from the outlet end toward the inlet end, partially covering the platinum group metal on a support.

Figure 2:
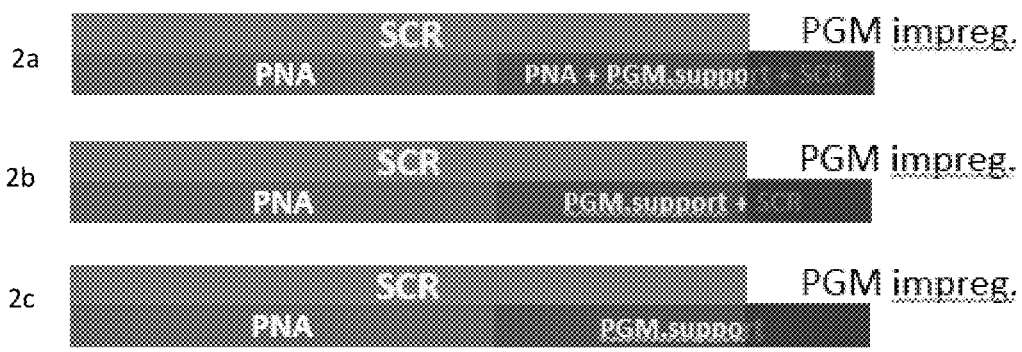

With reference to FIG. 2a, a catalytic article may include a PNA extending from the inlet end toward the outlet end, and a combination of an SCR catalyst, a PNA, and a platinum group metal on a support extending from the outlet end towards the inlet end. A top layer including an SCR catalyst extends from the inlet end towards the outlet end, covering the PNA and partially covering the combination of the SCR catalyst, PNA, and platinum group metal on a support. A platinum group metal is impregnated on the combination of an SCR catalyst, a PNA, and a platinum group metal on a support which is not covered by the top layer SCR catalyst.

With reference to FIG. 2b, a catalytic article may include a PNA extending from the inlet end toward the outlet end, and a combination of an SCR catalyst and a platinum group metal on a support extending from the outlet end towards the inlet end. A top layer including an SCR catalyst extends from the inlet end towards the outlet end, covering the PNA and partially covering the combination of the SCR catalyst and platinum group metal on a support. A platinum group metal is impregnated on the combination of an SCR catalyst and a platinum group metal on a support which is not covered by the top layer SCR catalyst.

With reference to FIG. 2c, a catalytic article may include a PNA extending from the inlet end toward the outlet end, and a platinum group metal on a support extending from the outlet end towards the inlet end. A top layer including an SCR catalyst extends from the inlet end towards the outlet end, covering the PNA and partially covering the platinum group metal on a support. A platinum group metal is impregnated on the platinum group metal on a support which is not covered by the top layer SCR catalyst.

Figure 3:
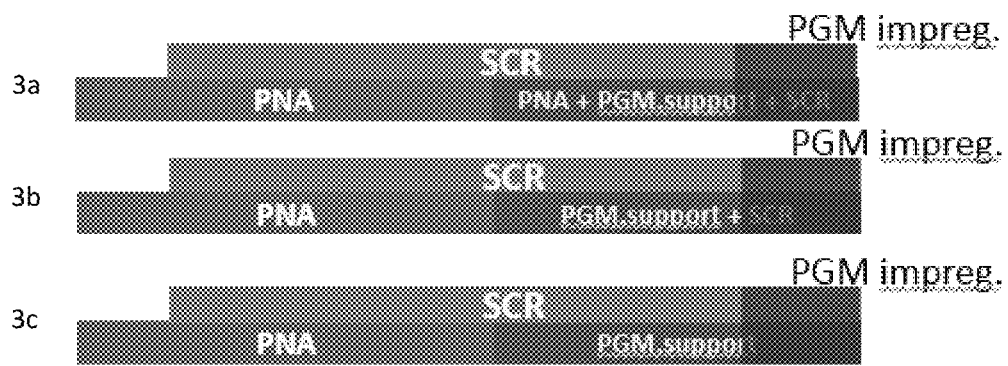

With reference to FIG. 3a, a catalytic article may include a PNA extending from the inlet end toward the outlet end, and a combination of an SCR catalyst, a PNA, and a platinum group metal on a support extending from the outlet end towards the inlet end. A top layer including an SCR catalyst extends from the outlet end towards the inlet end, extending less than the length of the substrate, covering the combination of the SCR catalyst, PNA, and platinum group metal on a support and partially covering the PNA. A platinum group metal is impregnated on the outlet end of the substrate.

With reference to FIG. 3b, a catalytic article may include a PNA extending from the inlet end toward the outlet end, and a combination of an SCR catalyst and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the PNA. A platinum group metal is impregnated on the outlet end of the substrate.

With reference to FIG. 3c, a catalytic article may include a PNA extending from the inlet end toward the outlet end, and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the PNA. A platinum group metal is impregnated on the outlet end of the substrate.

Figure 4:
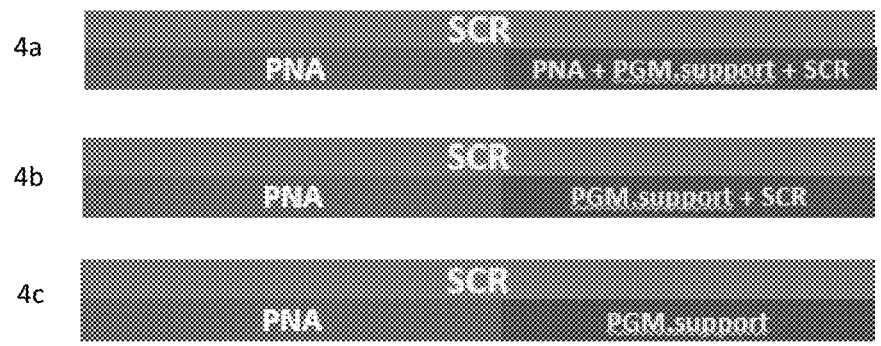

With reference to FIG. 4a, a catalytic article may include a PNA extending from the inlet end toward the outlet end, and a combination of an SCR catalyst, a PNA, and a platinum group metal on a support extending from the outlet end towards the inlet end. A top layer including an SCR catalyst extends the length of the substrate, covering the PNA and the combination of the SCR catalyst, PNA, and platinum group metal.

With reference to FIG. 4b, a catalytic article may include a PNA extending from the inlet end toward the outlet end, and a combination of an SCR catalyst and a platinum group metal on a support extending from the outlet end towards the inlet end. A top layer including an SCR catalyst extends the length of the substrate, covering the PNA and the combination of the SCR catalyst and platinum group metal on a support.

With reference to FIG. 4c, a catalytic article may include a PNA extending from the inlet end toward the outlet end, and a platinum group metal on a support extending from the outlet end towards the inlet end. A top layer including an SCR catalyst extends the length of the substrate, covering the PNA and the platinum group metal on a support.

Figure 5:
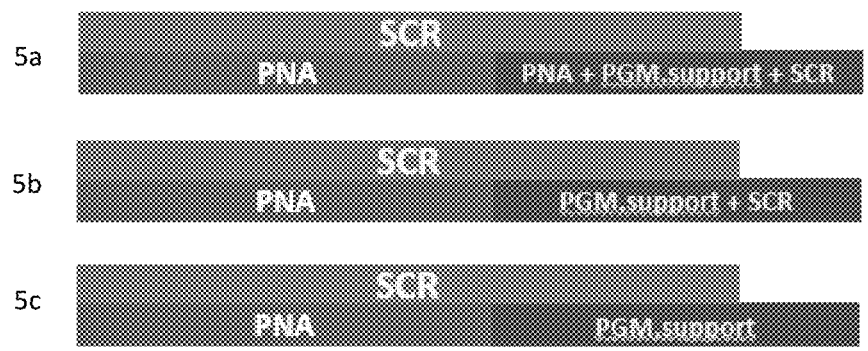

With reference to FIG. 5a, a catalytic article may include a PNA extending from the inlet end toward the outlet end, and a combination of an SCR catalyst, a PNA, and a platinum group metal on a support extending from the outlet end towards the inlet end. A top layer including an SCR catalyst extends from the inlet end towards the outlet end, covering the PNA and partially covering the combination of the SCR catalyst, PNA, and platinum group metal on a support.

With reference to FIG. 5b, a catalytic article may include a PNA extending from the inlet end toward the outlet end, and a combination of an SCR catalyst and a platinum group metal on a support extending from the outlet end towards the inlet end. A top layer including an SCR catalyst extends from the inlet end towards the outlet end, covering the PNA and partially covering the combination of the SCR catalyst and platinum group metal on a support.

With reference to FIG. 5c, a catalytic article may include a PNA extending from the inlet end toward the outlet end, and a platinum group metal on a support extending from the outlet end towards the inlet end. A top layer including an SCR catalyst extends from the inlet end towards the outlet end, covering the PNA and partially covering the platinum group metal on a support.

Figure 6:
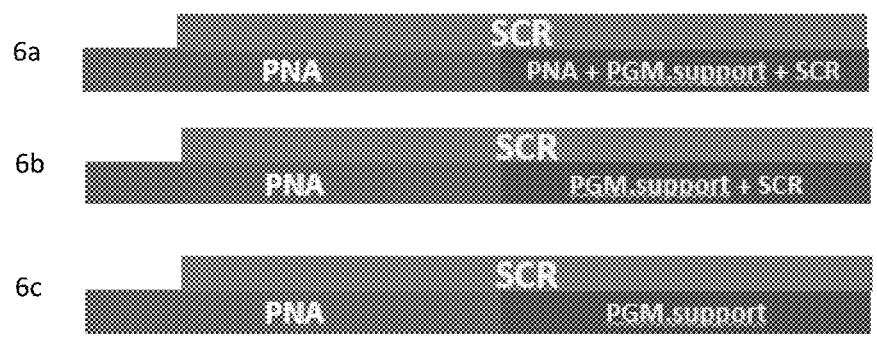

With reference to FIG. 6a, a catalytic article may include a PNA extending from the inlet end toward the outlet end, and a combination of an SCR catalyst, a PNA, and a platinum group metal on a support extending from the outlet end towards the inlet end. A top layer including an SCR catalyst extends from the outlet end towards the inlet end, extending less than the length of the substrate, covering the combination of the SCR catalyst, PNA, and platinum group metal on a support and partially covering the PNA.

With reference to FIG. 6b, a catalytic article may include a PNA extending from the inlet end toward the outlet end, and a combination of an SCR catalyst and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the PNA.

With reference to FIG. 6c, a catalytic article may include a PNA extending from the inlet end toward the outlet end, and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the PNA.

Figure 7:
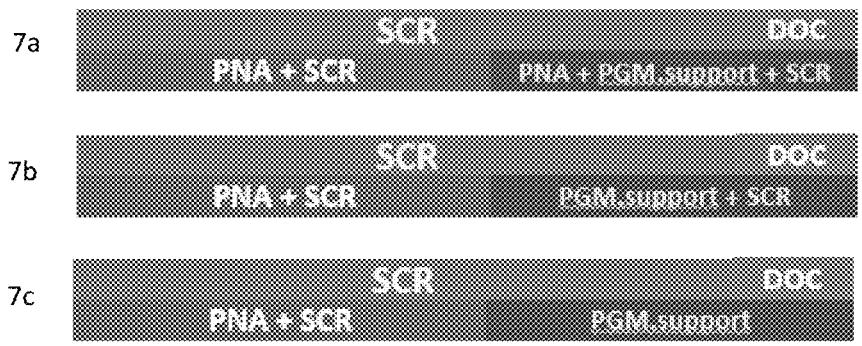

With reference to FIG. 7a, a catalytic article may include a combination of a PNA and an SCR catalyst extending from the inlet end toward the outlet end, and a combination of an SCR catalyst, a PNA, and a platinum group metal on a support extending from the outlet end towards the inlet end. A top layer including an SCR catalyst extends from the inlet end towards the outlet end, covering the combination of the PNA and SCR catalyst and partially covering the combination of the SCR catalyst, PNA, and platinum group metal. A DOC layer extends from the outlet end toward the inlet end, partially covering the combination of the SCR catalyst, PNA, and platinum group metal on a support.

With reference to FIG. 7b, a catalytic article may include a combination of a PNA and an SCR catalyst extending from the inlet end toward the outlet end, and a combination of an SCR catalyst and a platinum group metal on a support extending from the outlet end towards the inlet end. A top layer including an SCR catalyst extends from the inlet end towards the outlet end, covering the combination of the PNA and SCR catalyst and partially covering the combination of the SCR catalyst and platinum group metal on a support. A DOC layer extends from the outlet end toward the inlet end, partially covering the combination of the SCR catalyst and platinum group metal on a support.

With reference to FIG. 7c, a catalytic article may include a combination of a PNA and an SCR catalyst extending from the inlet end toward the outlet end, and a platinum group metal on a support extending from the outlet end towards the inlet end. A top layer including an SCR catalyst extends from the inlet end towards the outlet end, covering the combination of the PNA and SCR catalyst and partially covering the platinum group metal on a support. A DOC layer extends from the outlet end toward the inlet end, partially covering the platinum group metal on a support.

Figure 8:
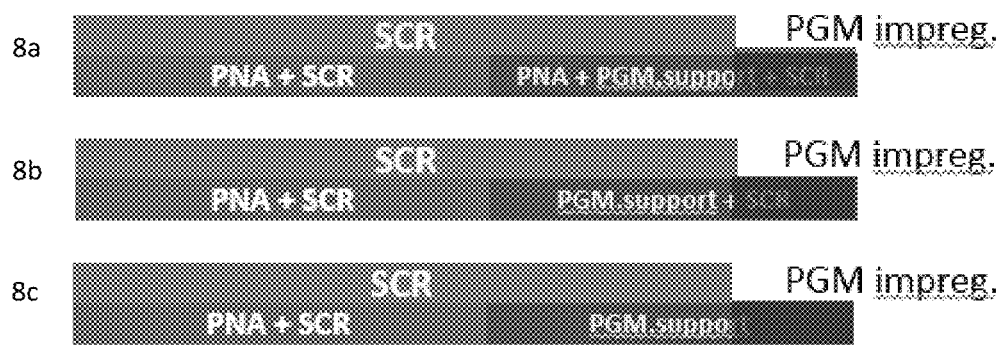

With reference to FIG. 8a, a catalytic article may include a combination of a PNA and an SCR catalyst extending from the inlet end toward the outlet end, and a combination of an SCR catalyst, a PNA, and a platinum group metal on a support extending from the outlet end towards the inlet end. A top layer including an SCR catalyst extends from the inlet end towards the outlet end, covering the combination of the PNA and SCR catalyst and partially covering the combination of the SCR catalyst, PNA, and platinum group metal on a support. A platinum group metal is impregnated on the combination of an SCR catalyst, a PNA, and a platinum group metal on a support which is not covered by the top layer SCR catalyst.

With reference to FIG. 8b, a catalytic article may include a combination of a PNA and an SCR catalyst extending from the inlet end toward the outlet end, and a combination of an SCR catalyst and a platinum group metal on a support extending from the outlet end towards the inlet end. A top layer including an SCR catalyst extends from the inlet end towards the outlet end, covering the combination of the PNA and SCR catalyst and partially covering the combination of the SCR catalyst and platinum group metal on a support. A platinum group metal is impregnated on the combination of an SCR catalyst and a platinum group metal on a support which is not covered by the top layer SCR catalyst.

With reference to FIG. 8c, a catalytic article may include a combination of a PNA and an SCR catalyst extending from the inlet end toward the outlet end, and a platinum group metal on a support extending from the outlet end towards the inlet end. A top layer including an SCR catalyst extends from the inlet end towards the outlet end, covering the combination of the PNA and SCR catalyst and partially covering the platinum group metal on a support. A platinum group metal is impregnated on the platinum group metal on a support which is not covered by the top layer SCR catalyst.

Figure 9:
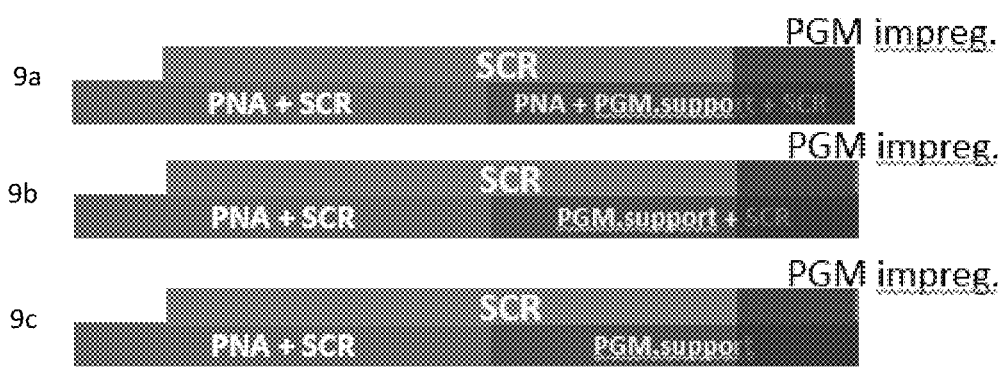

With reference to FIG. 9a, a catalytic article may include a combination of a PNA and an SCR catalyst extending from the inlet end toward the outlet end, and a combination of an SCR catalyst, a PNA, and a platinum group metal on a support extending from the outlet end towards the inlet end. A top layer including an SCR catalyst extends from the outlet end towards the inlet end, extending less than the length of the substrate, covering the combination of the SCR catalyst, PNA, and platinum group metal on a support and partially covering the combination of the PNA and SCR catalyst. A platinum group metal is impregnated on the outlet end of the substrate.

With reference to FIG. 9b, a catalytic article may include a combination of a PNA and an SCR catalyst extending from the inlet end toward the outlet end, and a combination of an SCR catalyst and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the combination of the PNA and SCR catalyst. A platinum group metal is impregnated on the outlet end of the substrate.

With reference to FIG. 9c, a catalytic article may include a combination of a PNA and an SCR catalyst extending from the inlet end toward the outlet end, and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the combination of the PNA and SCR catalyst. A platinum group metal is impregnated on the outlet end of the substrate.

Figure 10:
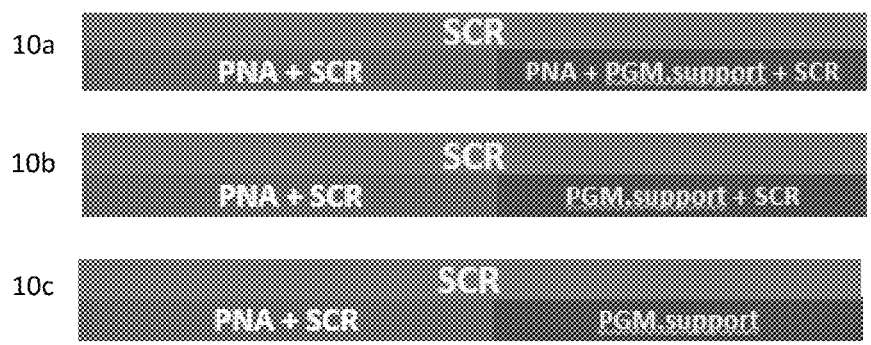

With reference to FIG. 10a, a catalytic article may include a combination of a PNA and an SCR catalyst extending from the inlet end toward the outlet end, and a combination of an SCR catalyst, a PNA, and a platinum group metal on a support extending from the outlet end towards the inlet end. A top layer including an SCR catalyst extends the length of the substrate, covering the combination of the PNA and SCR catalyst and the combination of the SCR catalyst, PNA, and platinum group metal.

With reference to FIG. 10b, a catalytic article may include a combination of a PNA and an SCR catalyst extending from the inlet end toward the outlet end, and a combination of an SCR catalyst and a platinum group metal on a support extending from the outlet end towards the inlet end. A top layer including an SCR catalyst extends the length of the substrate, covering the combination of the PNA and SCR catalyst and the combination of the SCR catalyst and platinum group metal on a support.

With reference to FIG. 10c, a catalytic article may include a combination of a PNA and an SCR catalyst extending from the inlet end toward the outlet end, and a platinum group metal on a support extending from the outlet end towards the inlet end. A top layer including an SCR catalyst extends the length of the substrate, covering the combination of the PNA and SCR catalyst and the platinum group metal on a support.

Figure 11:
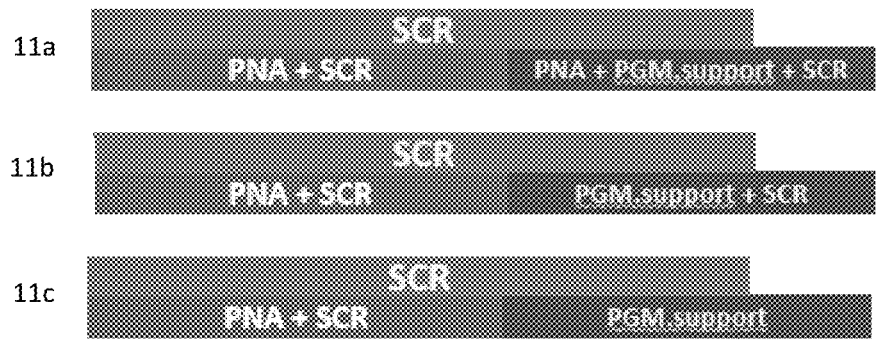

With reference to FIG. 11a, a catalytic article may include a combination of a PNA and an SCR catalyst extending from the inlet end toward the outlet end, and a combination of an SCR catalyst, a PNA, and a platinum group metal on a support extending from the outlet end towards the inlet end. A top layer including an SCR catalyst extends from the inlet end towards the outlet end, covering the combination of the PNA and SCR catalyst and partially covering the combination of the SCR catalyst, PNA, and platinum group metal on a support.

With reference to FIG. 11b, a catalytic article may include a combination of a PNA and an SCR catalyst extending from the inlet end toward the outlet end, and a combination of an SCR catalyst and a platinum group metal on a support extending from the outlet end towards the inlet end. A top layer including an SCR catalyst extends from the inlet end towards the outlet end, covering the combination of the PNA and SCR catalyst and partially covering the combination of the SCR catalyst and platinum group metal on a support.

With reference to FIG. 11c, a catalytic article may include a combination of a PNA and an SCR catalyst extending from the inlet end toward the outlet end, and a platinum group metal on a support extending from the outlet end towards the inlet end. A top layer including an SCR catalyst extends from the inlet end towards the outlet end, covering the combination of the PNA and SCR catalyst and partially covering the platinum group metal on a support.

Figure 12:
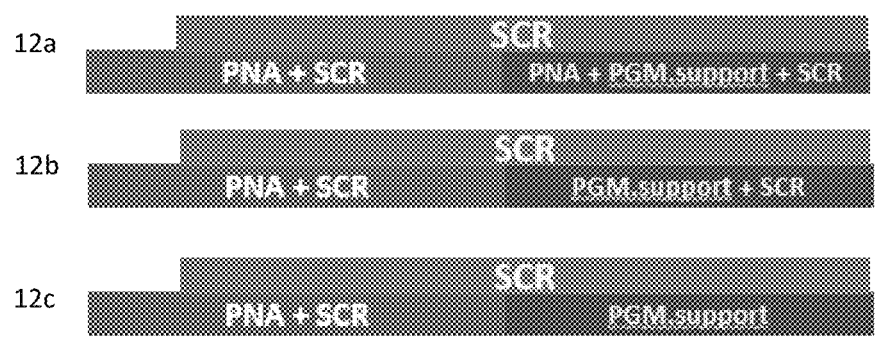

With reference to FIG. 12a, a catalytic article may include a combination of a PNA and an SCR catalyst extending from the inlet end toward the outlet end, and a combination of an SCR catalyst, a PNA, and a platinum group metal on a support extending from the outlet end towards the inlet end. A top layer including an SCR catalyst extends from the outlet end towards the inlet end, extending less than the length of the substrate, covering the combination of the SCR catalyst, PNA, and platinum group metal on a support and partially covering the combination of the PNA and SCR catalyst.

With reference to FIG. 12b, a catalytic article may include a combination of a PNA and an SCR catalyst extending from the inlet end toward the outlet end, and a combination of an SCR catalyst and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the combination of the PNA and SCR catalyst.

With reference to FIG. 12c, a catalytic article may include a combination of a PNA and an SCR catalyst extending from the inlet end toward the outlet end, and a platinum group metal on a support extending from the outlet end towards the inlet end. A top layer including an SCR catalyst extends from the outlet end towards the inlet end, extending less than the length of the substrate, covering the combination of the SCR catalyst and platinum group metal on a support and partially covering the combination of the PNA and SCR catalyst.

Figure 13:
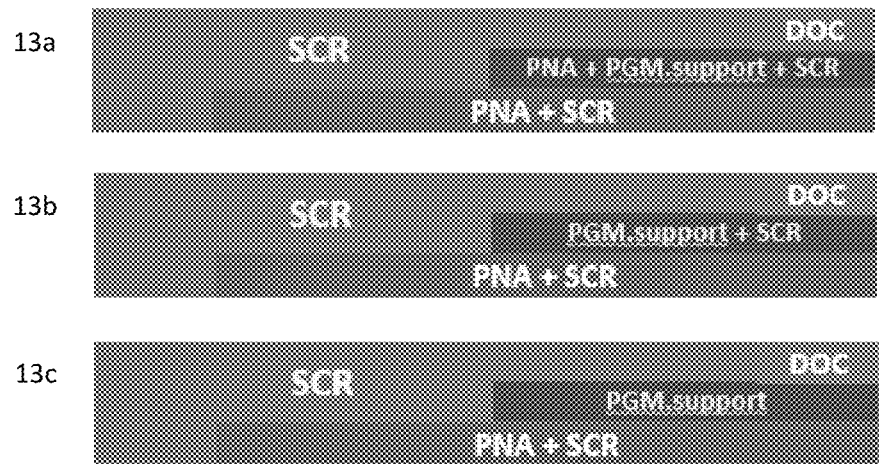

With reference to FIG. 13a, a catalytic article may include a combination of a PNA and an SCR catalyst extending from the outlet end toward the inlet end, extending less than the entire length of the substrate. A combination of an SCR catalyst, a PNA, and a platinum group metal on a support extends from the outlet end towards the inlet end, on top of the combination of the PNA and SCR catalyst, extending less than the entire length of the substrate. The combination of SCR/PNA/PGM.support layer may be shorter in length than the PNA/SCR combination. A DOC layer extends from the outlet end toward the inlet end, partially covering the combination of the SCR catalyst, PNA, and platinum group metal on a support. An SCR catalyst extends from the inlet end towards the outlet end, extending less than the entire length of the substrate, partially covering the combination of the PNA and SCR catalyst and the combination of the SCR catalyst, PNA, and platinum group metal on a support.

With reference to FIG. 13b, a catalytic article may include a combination of a PNA and an SCR catalyst extending from the outlet end toward the inlet end, extending less than the entire length of the substrate. A combination of an SCR catalyst and a platinum group metal on a support extends from the outlet end towards the inlet end, on top of the combination of the PNA and SCR catalyst, extending less than the entire length of the substrate. The combination of SCR/PGM.support layer may be shorter in length than the PNA/SCR combination. A DOC layer extends from the outlet end toward the inlet end, partially covering the combination of the SCR catalyst and platinum group metal on a support. An SCR catalyst extends from the inlet end towards the outlet end, extending less than the entire length of the substrate, partially covering the combination of the PNA and SCR catalyst and the combination of the SCR catalyst and platinum group metal on a support.

With reference to FIG. 13c, a catalytic article may include a combination of a PNA and an SCR catalyst extending from the outlet end toward the inlet end, extending less than the entire length of the substrate. A platinum group metal on a support extends from the outlet end towards the inlet end, on top of the combination of the PNA and SCR catalyst, extending less than the entire length of the substrate. The PGM.support layer may be shorter in length than the PNA/SCR combination. A DOC layer extends from the outlet end toward the inlet end, partially covering the platinum group metal on a support. An SCR catalyst extends from the inlet end towards the outlet end, extending less than the entire length of the substrate, partially covering the combination of the PNA and SCR catalyst and the platinum group metal on a support.

Figure 14:
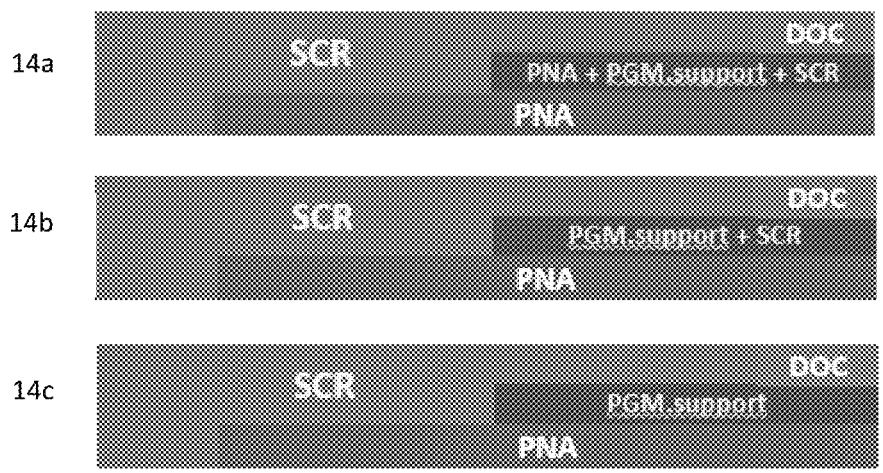

With reference to FIG. 14a, a catalytic article may include a PNA extending from the outlet end toward the inlet end, extending less than the entire length of the substrate. A combination of an SCR catalyst, a PNA, and a platinum group metal on a support extends from the outlet end towards the inlet end, on top of the PNA, extending less than the entire length of the substrate. The combination of SCR/PNA/PGM.support layer may be shorter in length than the PNA. A DOC layer extends from the outlet end toward the inlet end, partially covering the combination of the SCR catalyst, PNA, and platinum group metal on a support. An SCR catalyst extends from the inlet end towards the outlet end, extending less than the entire length of the substrate, partially covering the PNA and the combination of the SCR catalyst, PNA, and platinum group metal on a support.

With reference to FIG. 14b, a catalytic article may include a PNA extending from the outlet end toward the inlet end, extending less than the entire length of the substrate. A combination of an SCR catalyst and a platinum group metal on a support extends from the outlet end towards the inlet end, on top of the PNA, extending less than the entire length of the substrate. The combination of SCR/PGM.support layer may be shorter in length than the PNA. A DOC layer extends from the outlet end toward the inlet end, partially covering the combination of the SCR catalyst and platinum group metal on a support. An SCR catalyst extends from the inlet end towards the outlet end, extending less than the entire length of the substrate, partially covering the PNA and the combination of the SCR catalyst and platinum group metal on a support.

With reference to FIG. 14c, a catalytic article may include a PNA extending from the outlet end toward the inlet end, extending less than the entire length of the substrate. A platinum group metal on a support extends from the outlet end towards the inlet end, on top of the PNA, extending less than the entire length of the substrate. The PGM.support layer may be shorter in length than the PNA. A DOC layer extends from the outlet end toward the inlet end, partially covering the platinum group metal on a support. An SCR catalyst extends from the inlet end towards the outlet end, extending less than the entire length of the substrate, partially covering the PNA and the platinum group metal on a support.

Figure 15:
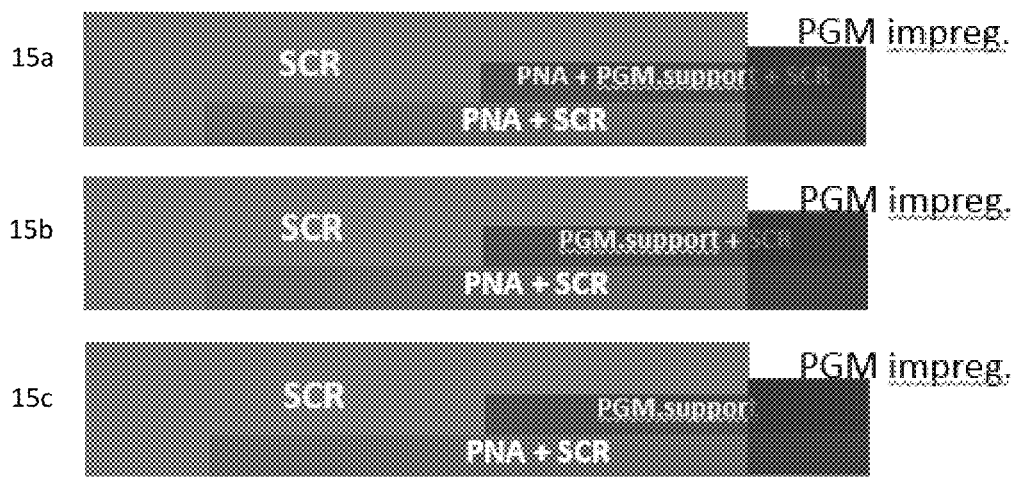

With reference to FIG. 15a, a catalytic article may include a combination of a PNA and an SCR catalyst extending from the outlet end toward the inlet end, extending less than the entire length of the substrate. A combination of an SCR catalyst, a PNA, and a platinum group metal on a support extends from the outlet end towards the inlet end, on top of the combination of the PNA and SCR catalyst, extending less than the entire length of the substrate. The combination of SCR/PNA/PGM.support layer may be shorter in length than the PNA/SCR combination. An SCR catalyst extends from the inlet end towards the outlet end, extending less than the entire length of the substrate, partially covering the combination of the PNA and SCR catalyst and the combination of the SCR catalyst, PNA, and platinum group metal on a support. A platinum group metal is impregnated on the combination of the PNA and SCR catalyst and the combination of the SCR catalyst, PNA, and platinum group metal on a support at the outlet end of the substrate.

With reference to FIG. 15b, a catalytic article may include a combination of a PNA and an SCR catalyst extending from the outlet end toward the inlet end, extending less than the entire length of the substrate. A combination of an SCR catalyst and a platinum group metal on a support extends from the outlet end towards the inlet end, on top of the combination of the PNA and SCR catalyst, extending less than the entire length of the substrate. The combination of SCR/PGM.support layer may be shorter in length than the PNA/SCR combination. An SCR catalyst extends from the inlet end towards the outlet end, extending less than the entire length of the substrate, partially covering the combination of the PNA and SCR catalyst and the combination of the SCR catalyst and platinum group metal on a support. A platinum group metal is impregnated on the combination of the PNA and SCR catalyst and the combination of the SCR catalyst and platinum group metal on a support at the outlet end of the substrate.

With reference to FIG. 15c, a catalytic article may include a combination of a PNA and an SCR catalyst extending from the outlet end toward the inlet end, extending less than the entire length of the substrate. A platinum group metal on a support extends from the outlet end towards the inlet end, on top of the combination of the PNA and SCR catalyst, extending less than the entire length of the substrate. The PGM.support layer may be shorter in length than the PNA/SCR combination. An SCR catalyst extends from the inlet end towards the outlet end, extending less than the entire length of the substrate, partially covering the combination of the PNA and SCR catalyst and the platinum group metal on a support. A platinum group metal is impregnated on the combination of the PNA and SCR catalyst and the platinum group metal on a support at the outlet end of the substrate.

Figure 16:
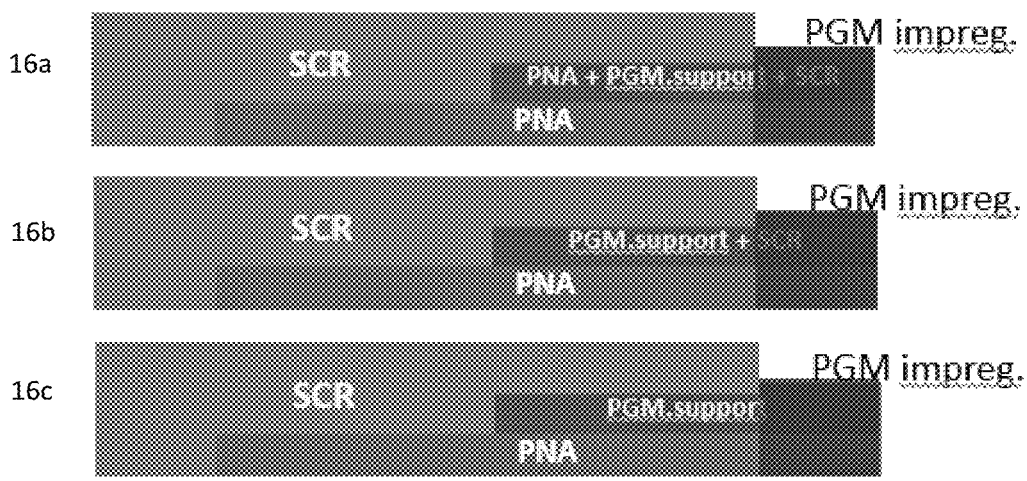

With reference to FIG. 16a, a catalytic article may include a PNA extending from the outlet end toward the inlet end, extending less than the entire length of the substrate. A combination of an SCR catalyst, a PNA, and a platinum group metal on a support extends from the outlet end towards the inlet end, on top of the PNA, extending less than the entire length of the substrate. The combination of SCR/PNA/PGM.support layer may be shorter in length than the PNA. An SCR catalyst extends from the inlet end towards the outlet end, extending less than the entire length of the substrate, partially covering the PNA and the combination of the SCR catalyst, PNA, and platinum group metal on a support. A platinum group metal is impregnated on the PNA and the combination of the SCR catalyst, PNA, and platinum group metal on a support at the outlet end of the substrate.

With reference to FIG. 16b, a catalytic article may include a PNA extending from the outlet end toward the inlet end, extending less than the entire length of the substrate. A combination of an SCR catalyst and a platinum group metal on a support extends from the outlet end towards the inlet end, on top of the PNA, extending less than the entire length of the substrate. The combination of SCR/PGM.support layer may be shorter in length than the PNA. An SCR catalyst extends from the inlet end towards the outlet end, extending less than the entire length of the substrate, partially covering the PNA and the combination of the SCR catalyst and platinum group metal on a support. A platinum group metal is impregnated on the PNA and the combination of the SCR catalyst and platinum group metal on a support at the outlet end of the substrate.

With reference to FIG. 16c, a catalytic article may include a PNA extending from the outlet end toward the inlet end, extending less than the entire length of the substrate. A platinum group metal on a support extends from the outlet end towards the inlet end, on top of the PNA, extending less than the entire length of the substrate. The PGM.support layer may be shorter in length than the PNA. An SCR catalyst extends from the inlet end towards the outlet end, extending less than the entire length of the substrate, partially covering the PNA and the platinum group metal on a support. A platinum group metal is impregnated on the PNA and the platinum group metal on a support at the outlet end of the substrate.

Figure 17:
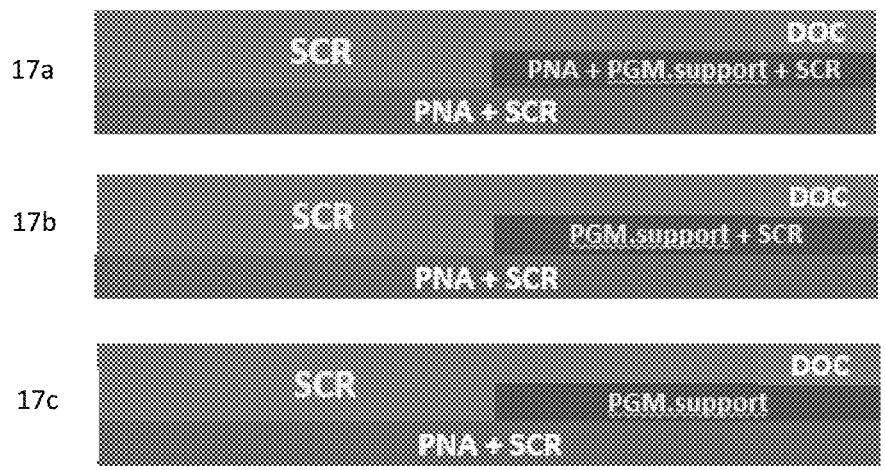

With reference to FIG. 17a, a catalytic article may include a combination of a PNA and an SCR catalyst extending the entire length of the substrate. A combination of an SCR catalyst, a PNA, and a platinum group metal on a support extends from the outlet end towards the inlet end, on top of the combination of the PNA and SCR catalyst, extending less than the entire length of the substrate. A DOC layer extends from the outlet end toward the inlet end, partially covering the combination of the SCR catalyst, PNA, and platinum group metal on a support. An SCR catalyst extends from the inlet end towards the outlet end, extending less than the entire length of the substrate, partially covering the combination of the PNA and SCR catalyst and the combination of the SCR catalyst, PNA, and platinum group metal on a support.

With reference to FIG. 17b, a catalytic article may include a combination of a PNA and an SCR catalyst extending the entire length of the substrate. A combination of an SCR catalyst and a platinum group metal on a support extends from the outlet end towards the inlet end, on top of the combination of the PNA and SCR catalyst, extending less than the entire length of the substrate. A DOC layer extends from the outlet end toward the inlet end, partially covering the combination of the SCR catalyst and platinum group metal on a support. An SCR catalyst extends from the inlet end towards the outlet end, extending less than the entire length of the substrate, partially covering the combination of the PNA and SCR catalyst and the combination of the SCR catalyst and platinum group metal on a support.

With reference to FIG. 17c, a catalytic article may include a combination of a PNA and an SCR catalyst extending the entire length of the substrate. A platinum group metal on a support extends from the outlet end towards the inlet end, on top of the combination of the PNA and SCR catalyst, extending less than the entire length of the substrate. A DOC layer extends from the outlet end toward the inlet end, partially covering the platinum group metal on a support. An SCR catalyst extends from the inlet end towards the outlet end, extending less than the entire length of the substrate, partially covering the combination of the PNA and SCR catalyst and the platinum group metal on a support.

Figure 18:
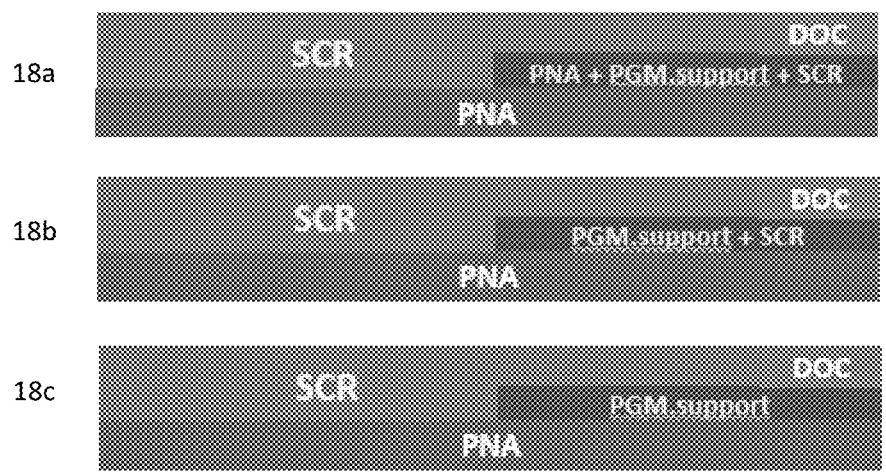

With reference to FIG. 18a, a catalytic article may include a PNA extending the entire length of the substrate. A combination of an SCR catalyst, a PNA, and a platinum group metal on a support extends from the outlet end towards the inlet end, on top of the PNA, extending less than the entire length of the substrate. A DOC layer extends from the outlet end toward the inlet end, partially covering the combination of the SCR catalyst, PNA, and platinum group metal on a support. An SCR catalyst extends from the inlet end towards the outlet end, extending less than the entire length of the substrate, partially covering the PNA and the combination of the SCR catalyst, PNA, and platinum group metal on a support.

With reference to FIG. 18b, a catalytic article may include a PNA extending the entire length of the substrate. A combination of an SCR catalyst and a platinum group metal on a support extends from the outlet end towards the inlet end, on top of the PNA, extending less than the entire length of the substrate. A DOC layer extends from the outlet end toward the inlet end, partially covering the combination of the SCR catalyst and platinum group metal on a support. An SCR catalyst extends from the inlet end towards the outlet end, extending less than the entire length of the substrate, partially covering the PNA and the combination of the SCR catalyst and platinum group metal on a support.

With reference to FIG. 18c, a catalytic article may include a PNA extending the entire length of the substrate. A platinum group metal on a support extends from the outlet end towards the inlet end, on top of the PNA, extending less than the entire length of the substrate. A DOC layer extends from the outlet end toward the inlet end, partially covering the platinum group metal on a support. An SCR catalyst extends from the inlet end towards the outlet end, extending less than the entire length of the substrate, partially covering the PNA and the platinum group metal on a support.

Figure 19:
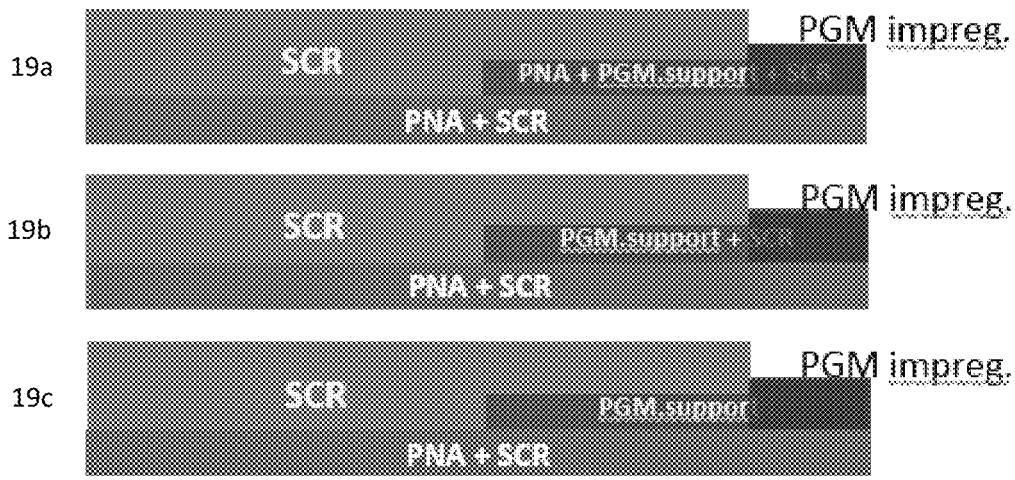

With reference to FIG. 19a, a catalytic article may include a combination of a PNA and an SCR catalyst extending the entire length of the substrate. A combination of an SCR catalyst, a PNA, and a platinum group metal on a support extends from the outlet end towards the inlet end, on top of the combination of the PNA and SCR catalyst, extending less than the entire length of the substrate. An SCR catalyst extends from the inlet end towards the outlet end, extending less than the entire length of the substrate, partially covering the combination of the PNA and SCR catalyst and the combination of the SCR catalyst, PNA, and platinum group metal on a support. A platinum group metal is impregnated on the combination of the PNA and SCR catalyst and the combination of the SCR catalyst, PNA, and platinum group metal on a support at the outlet end of the substrate.

With reference to FIG. 19b, a catalytic article may include a combination of a PNA and an SCR catalyst extending the entire length of the substrate. A combination of an SCR catalyst and a platinum group metal on a support extends from the outlet end towards the inlet end, on top of the combination of the PNA and SCR catalyst, extending less than the entire length of the substrate. An SCR catalyst extends from the inlet end towards the outlet end, extending less than the entire length of the substrate, partially covering the combination of the PNA and SCR catalyst and the combination of the SCR catalyst and platinum group metal on a support. A platinum group metal is impregnated on the combination of the PNA and SCR catalyst and the combination of the SCR catalyst and platinum group metal on a support at the outlet end of the substrate.

With reference to FIG. 19c, a catalytic article may include a combination of a PNA and an SCR catalyst extending the entire length of the substrate. A platinum group metal on a support extends from the outlet end towards the inlet end, on top of the combination of the PNA and SCR catalyst, extending less than the entire length of the substrate. An SCR catalyst extends from the inlet end towards the outlet end, extending less than the entire length of the substrate, partially covering the combination of the PNA and SCR catalyst and the platinum group metal on a support. A platinum group metal is impregnated on the combination of the PNA and SCR catalyst and the platinum group metal on a support at the outlet end of the substrate.

Figure 20:
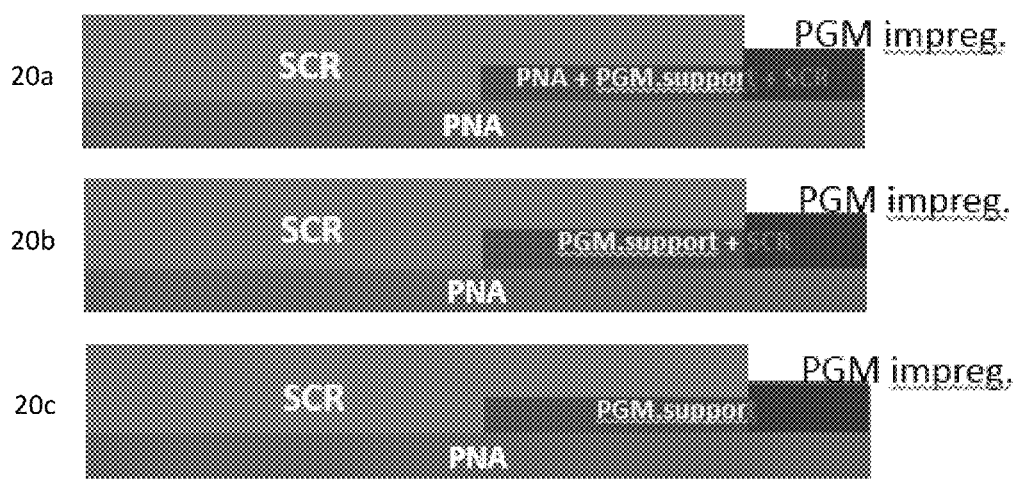

With reference to FIG. 20a, a catalytic article may include a PNA extending the entire length of the substrate. A combination of an SCR catalyst, a PNA, and a platinum group metal on a support extends from the outlet end towards the inlet end, on top of the PNA, extending less than the entire length of the substrate. An SCR catalyst extends from the inlet end towards the outlet end, extending less than the entire length of the substrate, partially covering the PNA and the combination of the SCR catalyst, PNA, and platinum group metal on a support. A platinum group metal is impregnated on the combination of the PNA and the combination of the SCR catalyst, PNA, and platinum group metal on a support at the outlet end of the substrate.

With reference to FIG. 20b, a catalytic article may include a PNA extending the entire length of the substrate. A combination of an SCR catalyst and a platinum group metal on a support extends from the outlet end towards the inlet end, on top of the PNA, extending less than the entire length of the substrate. An SCR catalyst extends from the inlet end towards the outlet end, extending less than the entire length of the substrate, partially covering the PNA and the combination of the SCR catalyst and platinum group metal on a support. A platinum group metal is impregnated on the combination of the PNA and the combination of the SCR catalyst and platinum group metal on a support at the outlet end of the substrate.

With reference to FIG. 20c, a catalytic article may include a PNA extending the entire length of the substrate. A platinum group metal on a support extends from the outlet end towards the inlet end, on top of the PNA, extending less than the entire length of the substrate. An SCR catalyst extends from the inlet end towards the outlet end, extending less than the entire length of the substrate, partially covering the PNA and the platinum group metal on a support. A platinum group metal is impregnated on the combination of the PNA and the platinum group metal on a support at the outlet end of the substrate.

Figure 21:
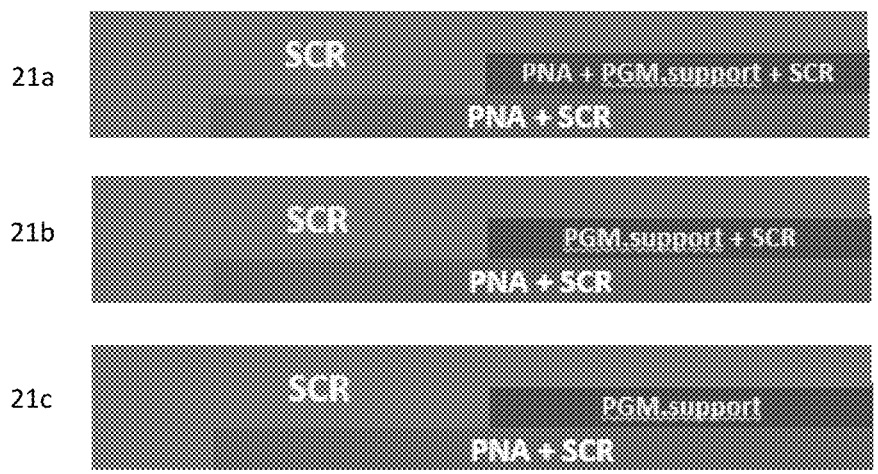

With reference to FIG. 21a, a catalytic article may include a combination of a PNA and an SCR catalyst extending from the outlet end toward the inlet end, extending less than the entire length of the substrate. A combination of an SCR catalyst, a PNA, and a platinum group metal on a support extends from the outlet end towards the inlet end, on top of the combination of the PNA and SCR catalyst, extending less than the entire length of the substrate. The combination of SCR/PNA/PGM.support layer may be shorter in length than the PNA/SCR combination. An SCR catalyst extends the entire length of the substrate, covering the combination of the PNA and SCR catalyst and the combination of the SCR catalyst, PNA, and platinum group metal on a support.

With reference to FIG. 21b, a catalytic article may include a combination of a PNA and an SCR catalyst extending from the outlet end toward the inlet end, extending less than the entire length of the substrate. A combination of an SCR catalyst and a platinum group metal on a support extends from the outlet end towards the inlet end, on top of the combination of the PNA and SCR catalyst, extending less than the entire length of the substrate. The combination of SCR/PGM.support layer may be shorter in length than the PNA/SCR combination. An SCR catalyst extends the entire length of the substrate, covering the combination of the PNA and SCR catalyst and the combination of the SCR catalyst and platinum group metal on a support.

With reference to FIG. 21c, a catalytic article may include a combination of a PNA and an SCR catalyst extending from the outlet end toward the inlet end, extending less than the entire length of the substrate. A platinum group metal on a support extends from the outlet end towards the inlet end, on top of the combination of the PNA and SCR catalyst, extending less than the entire length of the substrate. The PGM.support layer may be shorter in length than the PNA/SCR combination. An SCR catalyst extends the entire length of the substrate, covering the combination of the PNA and SCR catalyst and the platinum group metal on a support.

Figure 22:
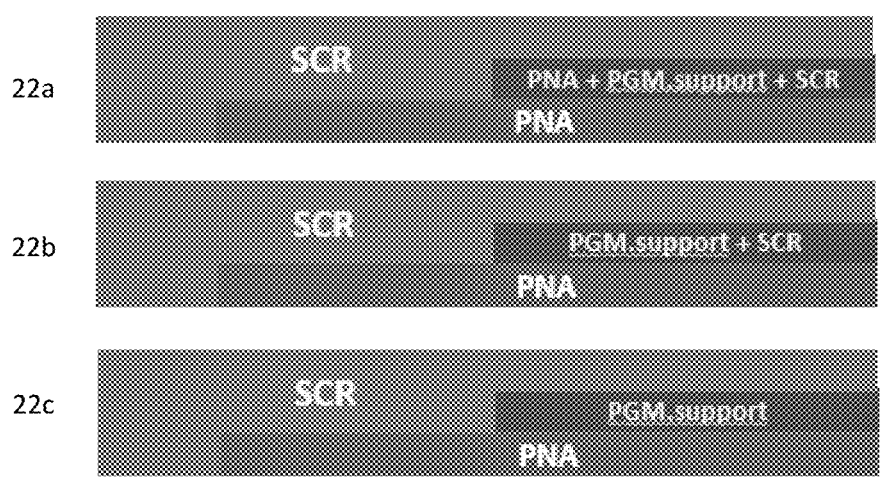

With reference to FIG. 22a, a catalytic article may include a PNA extending from the outlet end toward the inlet end, extending less than the entire length of the substrate. A combination of an SCR catalyst, a PNA, and a platinum group metal on a support extends from the outlet end towards the inlet end, on top of the PNA, extending less than the entire length of the substrate. The combination of SCR/PNA/PGM.support layer may be shorter in length than the PNA. An SCR catalyst extends the entire length of the substrate, covering the PNA and the combination of the SCR catalyst, PNA, and platinum group metal on a support.

With reference to FIG. 22b, a catalytic article may include a PNA extending from the outlet end toward the inlet end, extending less than the entire length of the substrate. A combination of an SCR catalyst and a platinum group metal on a support extends from the outlet end towards the inlet end, on top of the PNA, extending less than the entire length of the substrate. The combination of SCR/PGM.support layer may be shorter in length than the PNA. An SCR catalyst extends the entire length of the substrate, covering the PNA and the combination of the SCR catalyst and platinum group metal on a support.

With reference to FIG. 22c, a catalytic article may include a PNA extending from the outlet end toward the inlet end, extending less than the entire length of the substrate. A platinum group metal on a support extends from the outlet end towards the inlet end, on top of the PNA, extending less than the entire length of the substrate. The PGM.support layer may be shorter in length than the PNA. An SCR catalyst extends the entire length of the substrate, covering the PNA and the platinum group metal on a support.

Figure 23:
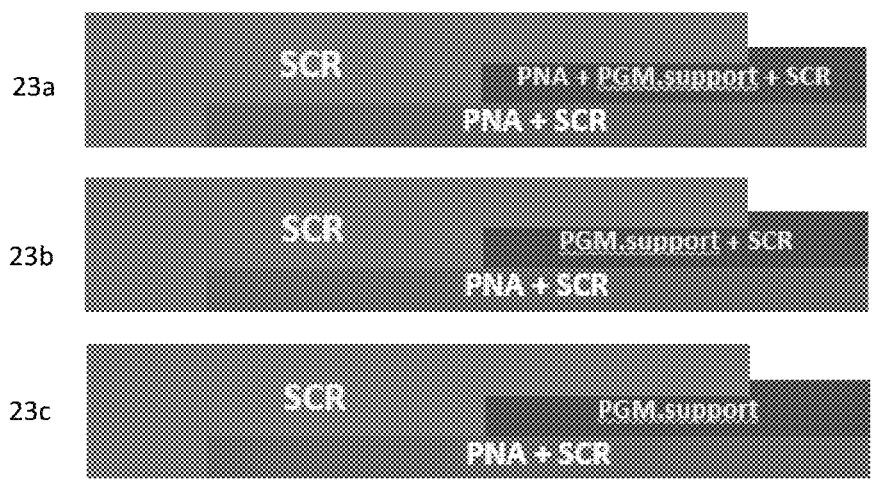

With reference to FIG. 23a, a catalytic article may include a combination of a PNA and an SCR catalyst extending from the outlet end toward the inlet end, extending less than the entire length of the substrate. A combination of an SCR catalyst, a PNA, and a platinum group metal on a support extends from the outlet end towards the inlet end, on top of the combination of the PNA and SCR catalyst, extending less than the entire length of the substrate. The combination of SCR/PNA/PGM.support layer may be shorter in length than the PNA/SCR combination. An SCR catalyst extends from the inlet end towards the outlet end, extending less than the entire length of the substrate, partially covering the combination of the PNA and SCR catalyst and the combination of the SCR catalyst, PNA, and platinum group metal on a support.

With reference to FIG. 23b, a catalytic article may include a combination of a PNA and an SCR catalyst extending from the outlet end toward the inlet end, extending less than the entire length of the substrate. A combination of an SCR catalyst and a platinum group metal on a support extends from the outlet end towards the inlet end, on top of the combination of the PNA and SCR catalyst, extending less than the entire length of the substrate. The combination of SCR/PGM.support layer may be shorter in length than the PNA/SCR combination. An SCR catalyst extends from the inlet end towards the outlet end, extending less than the entire length of the substrate, partially covering the combination of the PNA and SCR catalyst and the combination of the SCR catalyst and platinum group metal on a support.

With reference to FIG. 23c, a catalytic article may include a combination of a PNA and an SCR catalyst extending from the outlet end toward the inlet end, extending less than the entire length of the substrate. A platinum group metal on a support extends from the outlet end towards the inlet end, on top of the combination of the PNA and SCR catalyst, extending less than the entire length of the substrate. The PGM.support layer may be shorter in length than the PNA/SCR combination. An SCR catalyst extends from the inlet end towards the outlet end, extending less than the entire length of the substrate, partially covering the combination of the PNA and SCR catalyst and the platinum group metal on a support.

Figure 24:
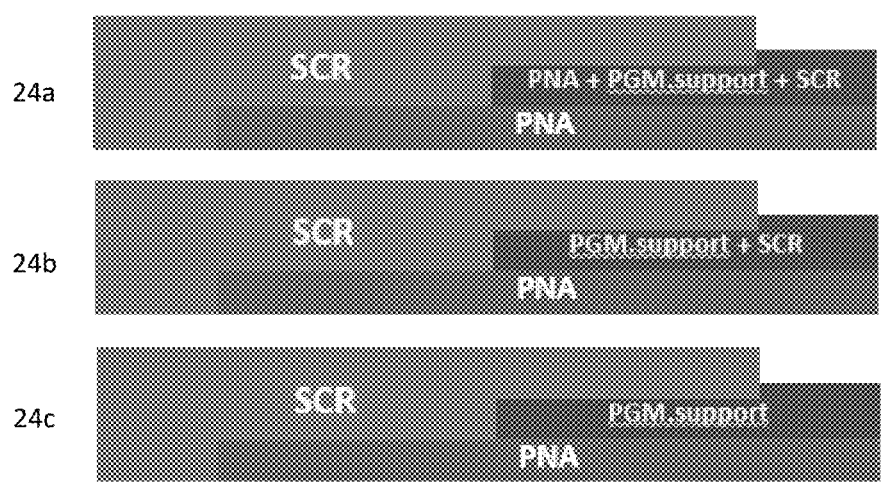

With reference to FIG. 24a, a catalytic article may include a PNA extending from the outlet end toward the inlet end, extending less than the entire length of the substrate. A combination of an SCR catalyst, a PNA, and a platinum group metal on a support extends from the outlet end towards the inlet end, on top of the PNA, extending less than the entire length of the substrate. The combination of SCR/PNA/PGM.support layer may be shorter in length than the PNA. An SCR catalyst extends from the inlet end towards the outlet end, extending less than the entire length of the substrate, partially covering the PNA and the combination of the SCR catalyst, PNA, and platinum group metal on a support.

With reference to FIG. 24b, a catalytic article may include a PNA extending from the outlet end toward the inlet end, extending less than the entire length of the substrate. A combination of an SCR catalyst and a platinum group metal on a support extends from the outlet end towards the inlet end, on top of the PNA, extending less than the entire length of the substrate. The combination of SCR/PGM.support layer may be shorter in length than the PNA. An SCR catalyst extends from the inlet end towards the outlet end, extending less than the entire length of the substrate, partially covering the PNA and the combination of the SCR catalyst and platinum group metal on a support.

With reference to FIG. 24c, a catalytic article may include a PNA extending from the outlet end toward the inlet end, extending less than the entire length of the substrate. A platinum group metal on a support extends from the outlet end towards the inlet end, on top of the PNA, extending less than the entire length of the substrate. The PGM.support layer may be shorter in length than the PNA. An SCR catalyst extends from the inlet end towards the outlet end, extending less than the entire length of the substrate, partially covering the PNA and the platinum group metal on a support With reference to FIG. 25a, a catalytic article may include a combination of a PNA and an SCR catalyst extending the entire length of the substrate. A combination of an SCR catalyst, a PNA, and a platinum group metal on a support extends from the outlet end towards the inlet end, on top of the combination of the PNA and SCR catalyst, extending less than the entire length of the substrate. An SCR catalyst extends the entire length of the substrate, covering the combination of the PNA and SCR catalyst and the combination of the SCR catalyst, PNA, and platinum group metal on a support.

Figure 25:
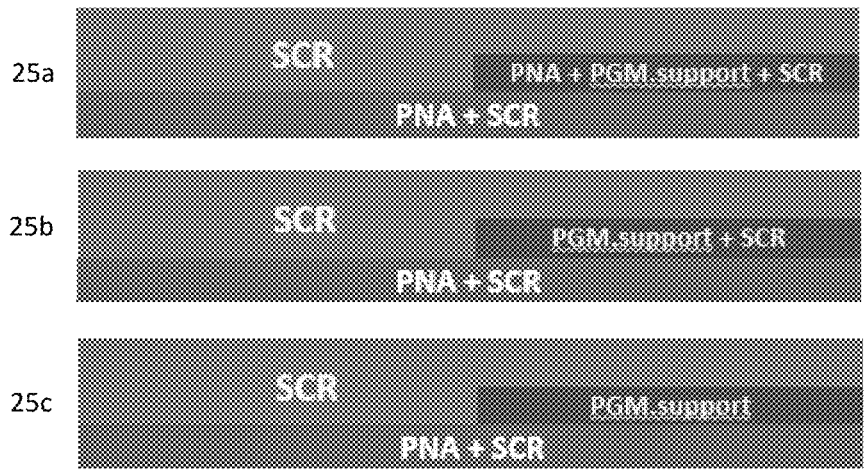

With reference to FIG. 25b, a catalytic article may include a combination of a PNA and an SCR catalyst extending the entire length of the substrate. A combination of an SCR catalyst and a platinum group metal on a support extends from the outlet end towards the inlet end, on top of the combination of the PNA and SCR catalyst, extending less than the entire length of the substrate. An SCR catalyst extends the entire length of the substrate, covering the combination of the PNA and SCR catalyst and the combination of the SCR catalyst and platinum group metal on a support.

With reference to FIG. 25c, a catalytic article may include a combination of a PNA and an SCR catalyst extending the entire length of the substrate. A platinum group metal on a support extends from the outlet end towards the inlet end, on top of the combination of the PNA and SCR catalyst, extending less than the entire length of the substrate. An SCR catalyst extends the entire length of the substrate, covering the combination of the PNA and SCR catalyst and the platinum group metal on a support.

Figure 26:
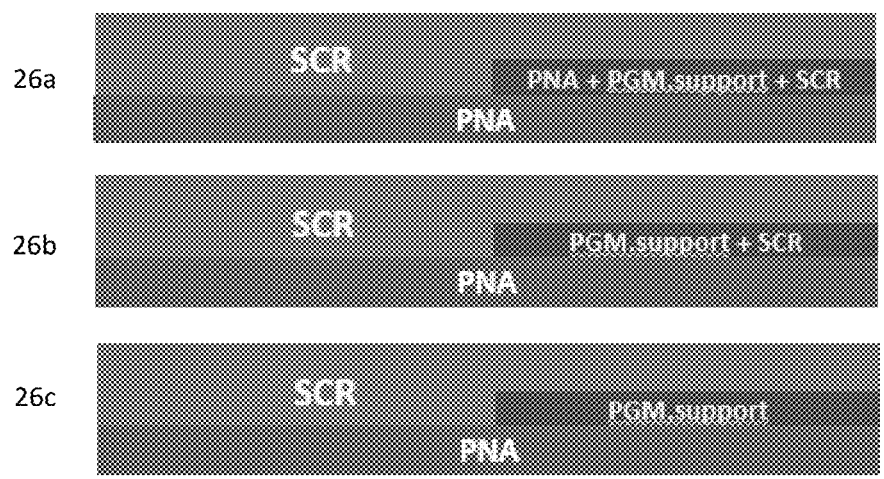

With reference to FIG. 26a, a catalytic article may include a PNA extending the entire length of the substrate. A combination of an SCR catalyst, a PNA, and a platinum group metal on a support extends from the outlet end towards the inlet end, on top of the PNA, extending less than the entire length of the substrate. An SCR catalyst extends the entire length of the substrate, covering the PNA and the combination of the SCR catalyst, PNA, and platinum group metal on a support.

With reference to FIG. 26b, a catalytic article may include a PNA extending the entire length of the substrate. A combination of an SCR catalyst and a platinum group metal on a support extends from the outlet end towards the inlet end, on top of the PNA, extending less than the entire length of the substrate. An SCR catalyst extends the entire length of the substrate, covering the PNA and the combination of the SCR catalyst and platinum group metal on a support.

With reference to FIG. 26c, a catalytic article may include a PNA extending the entire length of the substrate. A platinum group metal on a support extends from the outlet end towards the inlet end, on top of the PNA, extending less than the entire length of the substrate. An SCR catalyst extends the entire length of the substrate, covering the PNA and the platinum group metal on a support.

Figure 27:
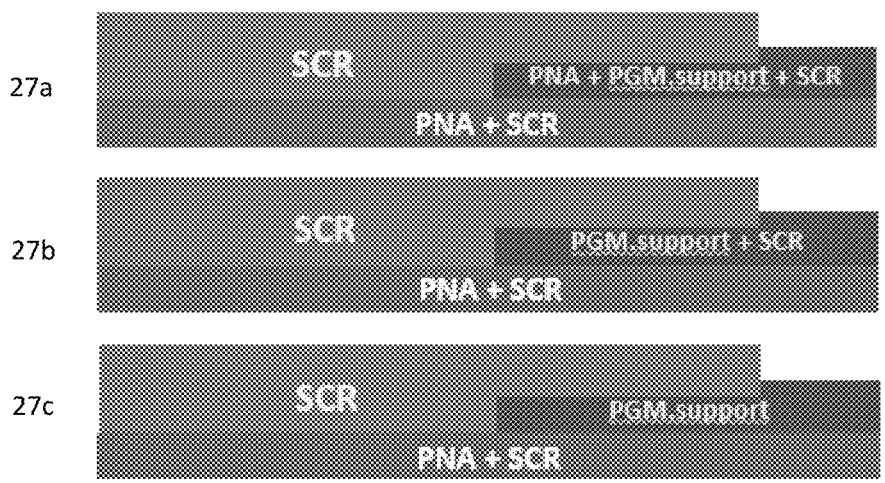

With reference to FIG. 27a, a catalytic article may include a combination of a PNA and an SCR catalyst extending the entire length of the substrate. A combination of an SCR catalyst, a PNA, and a platinum group metal on a support extends from the outlet end towards the inlet end, on top of the combination of the PNA and SCR catalyst, extending less than the entire length of the substrate. An SCR catalyst extends from the inlet end towards the outlet end, extending less than the entire length of the substrate, partially covering the combination of the PNA and SCR catalyst and the combination of the SCR catalyst, PNA, and platinum group metal on a support.

With reference to FIG. 27b, a catalytic article may include a combination of a PNA and an SCR catalyst extending the entire length of the substrate. A combination of an SCR catalyst and a platinum group metal on a support extends from the outlet end towards the inlet end, on top of the combination of the PNA and SCR catalyst, extending less than the entire length of the substrate. An SCR catalyst extends from the inlet end towards the outlet end, extending less than the entire length of the substrate, partially covering the combination of the PNA and SCR catalyst and the combination of the SCR catalyst and platinum group metal on a support.

With reference to FIG. 27c, a catalytic article may include a combination of a PNA and an SCR catalyst extending the entire length of the substrate. A platinum group metal on a support extends from the outlet end towards the inlet end, on top of the combination of the PNA and SCR catalyst, extending less than the entire length of the substrate. An SCR catalyst extends from the inlet end towards the outlet end, extending less than the entire length of the substrate, partially covering the combination of the PNA and SCR catalyst and the platinum group metal on a support.

Figure 28:
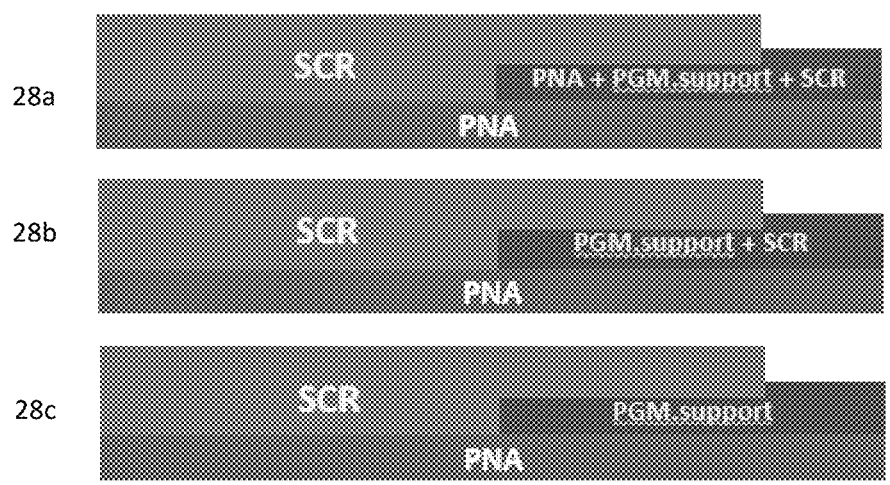

With reference to FIG. 28a, a catalytic article may include a PNA extending the entire length of the substrate. A combination of an SCR catalyst, a PNA, and a platinum group metal on a support extends from the outlet end towards the inlet end, on top of the PNA, extending less than the entire length of the substrate. An SCR catalyst extends from the inlet end towards the outlet end, extending less than the entire length of the substrate, partially covering the PNA and the combination of the SCR catalyst, PNA, and platinum group metal on a support.

With reference to FIG. 28b, a catalytic article may include a PNA extending the entire length of the substrate. A combination of an SCR catalyst and a platinum group metal on a support extends from the outlet end towards the inlet end, on top of the PNA, extending less than the entire length of the substrate. An SCR catalyst extends from the inlet end towards the outlet end, extending less than the entire length of the substrate, partially covering the PNA and the combination of the SCR catalyst and platinum group metal on a support.

With reference to FIG. 28c, a catalytic article may include a PNA extending the entire length of the substrate. A platinum group metal on a support extends from the outlet end towards the inlet end, on top of the PNA, extending less than the entire length of the substrate. An SCR catalyst extends from the inlet end towards the outlet end, extending less than the entire length of the substrate, partially covering the PNA and the platinum group metal on a support.

Figure 29:
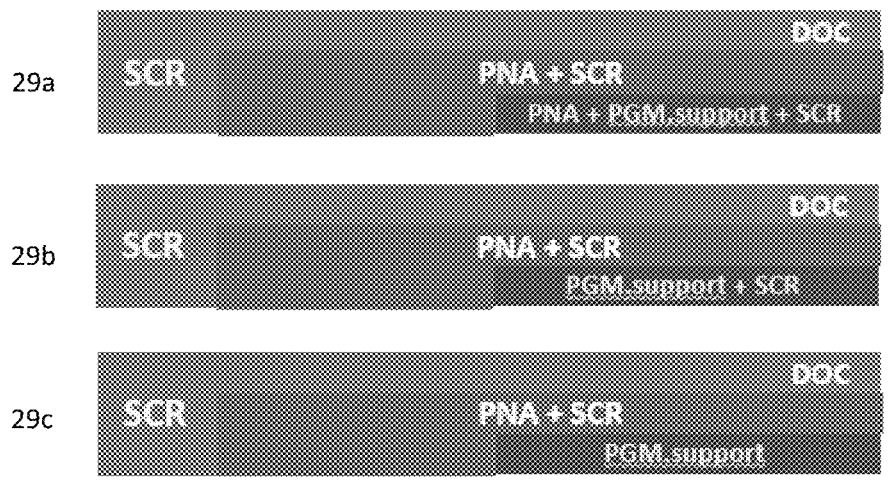

With reference to FIG. 29a, a catalytic article may include a combination of an SCR catalyst, a PNA, and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst, PNA, and platinum group metal on a support. The PNA/SCR combination may be longer in length than the combination of SCR/PNA/PGM.support layer. A DOC layer extends from the outlet end toward the inlet end, partially covering the combination of the PNA and SCR catalyst. An SCR catalyst extends from the inlet end towards the outlet end, extending less than the entire length of the substrate, partially covering the combination of the PNA and SCR catalyst.

With reference to FIG. 29b, a catalytic article may include a combination of an SCR catalyst and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst and platinum group metal on a support. The PNA/SCR combination may be longer in length than the combination of SCR/PGM.support layer. A DOC layer extends from the outlet end toward the inlet end, partially covering the combination of the PNA and SCR catalyst. An SCR catalyst extends from the inlet end towards the outlet end, extending less than the entire length of the substrate, partially covering the combination of the PNA and SCR catalyst.

With reference to FIG. 29c, a catalytic article may include a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the platinum group metal on a support. The PNA/SCR combination may be longer in length than the platinum group metal on a support. A DOC layer extends from the outlet end toward the inlet end, partially covering the combination of the PNA and SCR catalyst. An SCR catalyst extends from the inlet end towards the outlet end, extending less than the entire length of the substrate, partially covering the combination of the PNA and SCR catalyst.

Figure 30:
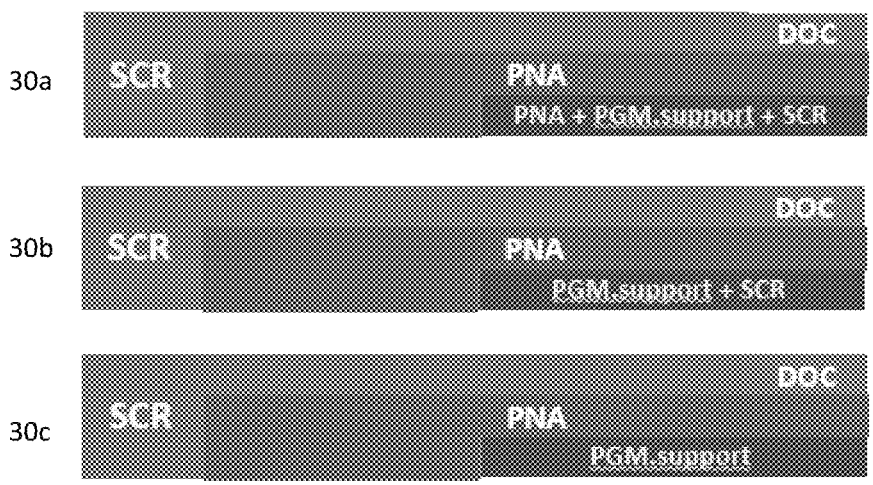

With reference to FIG. 30a, a catalytic article may include a combination of an SCR catalyst, a PNA, and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst, PNA, and platinum group metal on a support. The PNA may be longer in length than the combination of SCR/PNA/PGM.support layer. A DOC layer extends from the outlet end toward the inlet end, partially covering the PNA. An SCR catalyst extends from the inlet end towards the outlet end, extending less than the entire length of the substrate, partially covering the PNA.

With reference to FIG. 30b, a catalytic article may include a combination of an SCR catalyst and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst and platinum group metal on a support. The PNA may be longer in length than the combination of SCR/PGM.support layer. A DOC layer extends from the outlet end toward the inlet end, partially covering the PNA. An SCR catalyst extends from the inlet end towards the outlet end, extending less than the entire length of the substrate, partially covering the PNA.

With reference to FIG. 30c, a catalytic article may include a platinum group metal on a support extending from the outlet end towards the inlet end, extending less than the entire length of the substrate. A PNA extends from the outlet end toward the inlet end, extending less than the entire length of the substrate, and covering the platinum group metal on a support. The PNA may be longer in length than the platinum group metal on a support. A DOC layer extends from the outlet end toward the inlet end, partially covering the PNA. An SCR catalyst extends from the inlet end towards the outlet end, extending less than the entire length of the substrate, partially covering the PNA.

Figure 31:
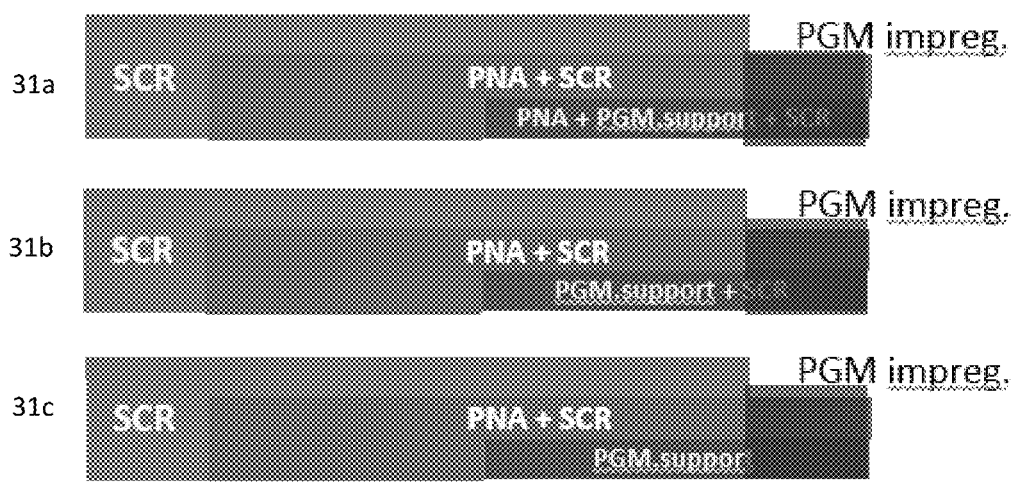

With reference to FIG. 31a, a catalytic article may include a combination of an SCR catalyst, a PNA, and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst, PNA, and platinum group metal on a support. The PNA/SCR combination may be longer in length than the combination of SCR/PNA/PGM.support layer. An SCR catalyst extends from the inlet end towards the outlet end, extending less than the entire length of the substrate, partially covering the combination of the PNA and SCR catalyst. A platinum group metal is impregnated on the combination of the PNA and SCR catalyst and the combination of the SCR catalyst, PNA, and platinum group metal on a support at the outlet end of the substrate.

With reference to FIG. 31b, a catalytic article may include a combination of an SCR catalyst and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst and platinum group metal on a support. The PNA/SCR combination may be longer in length than the combination of SCR/PGM.support layer. An SCR catalyst extends from the inlet end towards the outlet end, extending less than the entire length of the substrate, partially covering the combination of the PNA and SCR catalyst. A platinum group metal is impregnated on the combination of the PNA and SCR catalyst and the combination of the SCR catalyst and platinum group metal on a support at the outlet end of the substrate.

With reference to FIG. 31c, a catalytic article may include a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the platinum group metal on a support. The PNA/SCR combination may be longer in length than the platinum group metal on a support. An SCR catalyst extends from the inlet end towards the outlet end, extending less than the entire length of the substrate, partially covering the combination of the PNA and SCR catalyst. A platinum group metal is impregnated on the combination of the PNA and SCR catalyst and the platinum group metal on a support at the outlet end of the substrate.

Figure 32:
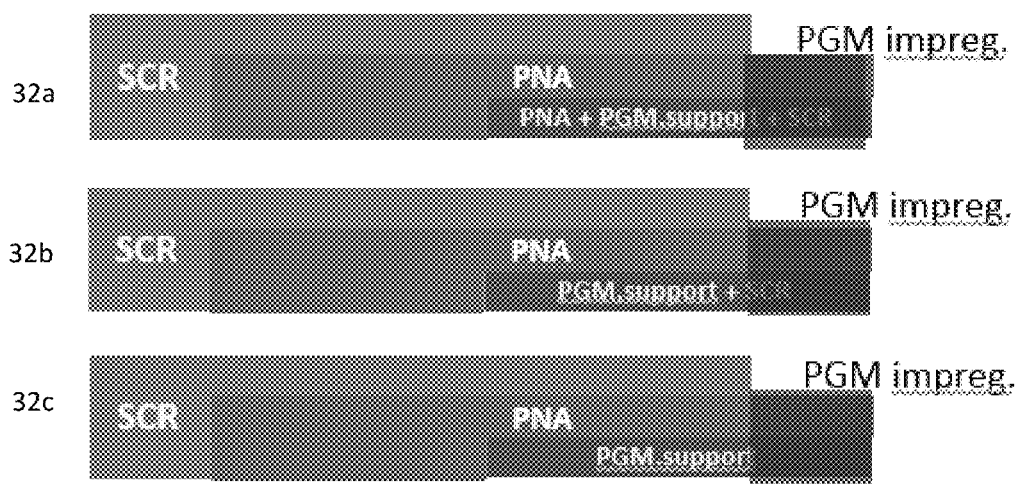

With reference to FIG. 32a, a catalytic article may include a combination of an SCR catalyst, a PNA, and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst, PNA, and platinum group metal on a support. The PNA may be longer in length than the combination of SCR/PNA/PGM.support layer. An SCR catalyst extends from the inlet end towards the outlet end, extending less than the entire length of the substrate, partially covering the PNA. A platinum group metal is impregnated on the PNA and the combination of the SCR catalyst, PNA, and platinum group metal on a support at the outlet end of the substrate.

With reference to FIG. 32b, a catalytic article may include a combination of an SCR catalyst and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst and platinum group metal on a support. The PNA may be longer in length than the combination of SCR/PGM.support layer. An SCR catalyst extends from the inlet end towards the outlet end, extending less than the entire length of the substrate, partially covering the PNA. A platinum group metal is impregnated on the PNA and the combination of the SCR catalyst and platinum group metal on a support at the outlet end of the substrate.

With reference to FIG. 32c, a catalytic article may include a platinum group metal on a support extending from the outlet end towards the inlet end, extending less than the entire length of the substrate. A PNA extends from the outlet end toward the inlet end, extending less than the entire length of the substrate, and covering the platinum group metal on a support. The PNA may be longer in length than the platinum group metal on a support. An SCR catalyst extends from the inlet end towards the outlet end, extending less than the entire length of the substrate, partially covering the PNA. A platinum group metal is impregnated on the PNA and the platinum group metal on a support at the outlet end of the substrate.

Figure 33:
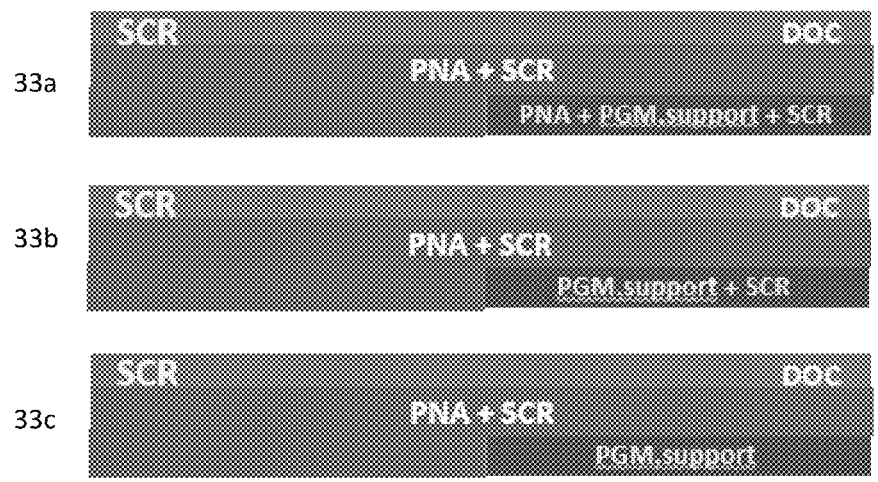

With reference to FIG. 33a, a catalytic article may include a combination of an SCR catalyst, a PNA, and a platinum group metal on a support extending from the outlet end towards the inlet end, extending less than the entire length of the substrate. A combination of a PNA and an SCR catalyst extends the entire length of the substrate, covering the combination of the SCR catalyst, PNA, and platinum group metal on a support. A DOC layer extends from the outlet end toward the inlet end, partially covering the combination of the PNA and SCR catalyst. An SCR catalyst extends from the inlet end towards the outlet end, extending less than the entire length of the substrate, partially covering the combination of the PNA and SCR catalyst.

With reference to FIG. 33b, a catalytic article may include a combination of an SCR catalyst and a platinum group metal on a support extending from the outlet end towards the inlet end, extending less than the entire length of the substrate. A combination of a PNA and an SCR catalyst extends the entire length of the substrate, covering the combination of the SCR catalyst and platinum group metal on a support. A DOC layer extends from the outlet end toward the inlet end, partially covering the combination of the PNA and SCR catalyst. An SCR catalyst extends from the inlet end towards the outlet end, extending less than the entire length of the substrate, partially covering the combination of the PNA and SCR catalyst.

With reference to FIG. 33c, a catalytic article may include a platinum group metal on a support extending from the outlet end towards the inlet end, extending less than the entire length of the substrate. A combination of a PNA and an SCR catalyst extends the entire length of the substrate, covering the platinum group metal on a support. A DOC layer extends from the outlet end toward the inlet end, partially covering the combination of the PNA and SCR catalyst. An SCR catalyst extends from the inlet end towards the outlet end, extending less than the entire length of the substrate, partially covering the combination of the PNA and SCR catalyst.

Figure 34:
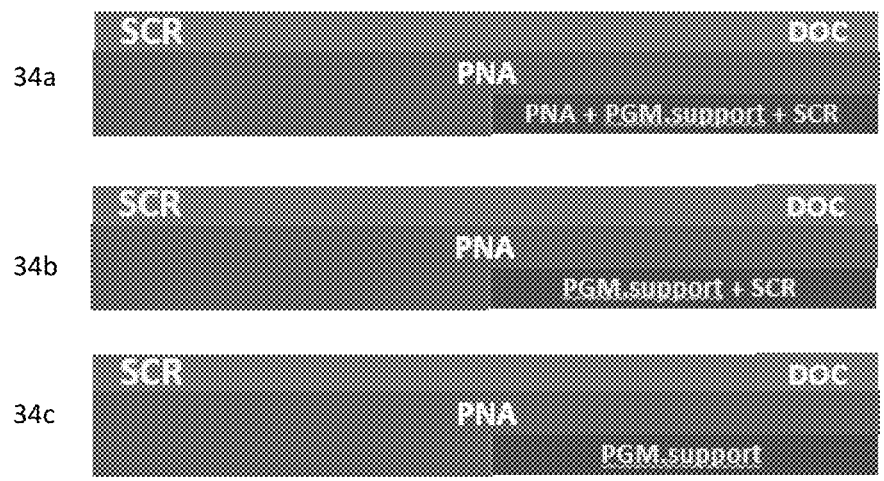

With reference to FIG. 34a, a catalytic article may include a combination of an SCR catalyst, a PNA, and a platinum group metal on a support extending from the outlet end towards the inlet end, extending less than the entire length of the substrate. A PNA extends the entire length of the substrate, covering the combination of the SCR catalyst, PNA, and platinum group metal on a support. A DOC layer extends from the outlet end toward the inlet end, partially covering the PNA. An SCR catalyst extends from the inlet end towards the outlet end, extending less than the entire length of the substrate, partially covering the PNA.

With reference to FIG. 34b, a catalytic article may include a combination of an SCR catalyst and a platinum group metal on a support extending from the outlet end towards the inlet end, extending less than the entire length of the substrate. A PNA extends the entire length of the substrate, covering the combination of the SCR catalyst and platinum group metal on a support. A DOC layer extends from the outlet end toward the inlet end, partially covering the PNA. An SCR catalyst extends from the inlet end towards the outlet end, extending less than the entire length of the substrate, partially covering the PNA.

With reference to FIG. 34c, a catalytic article may include a platinum group metal on a support extending from the outlet end towards the inlet end, extending less than the entire length of the substrate. A PNA extends the entire length of the substrate, covering the platinum group metal on a support. A DOC layer extends from the outlet end toward the inlet end, partially covering the PNA. An SCR catalyst extends from the inlet end towards the outlet end, extending less than the entire length of the substrate, partially covering the PNA.

Figure 35:
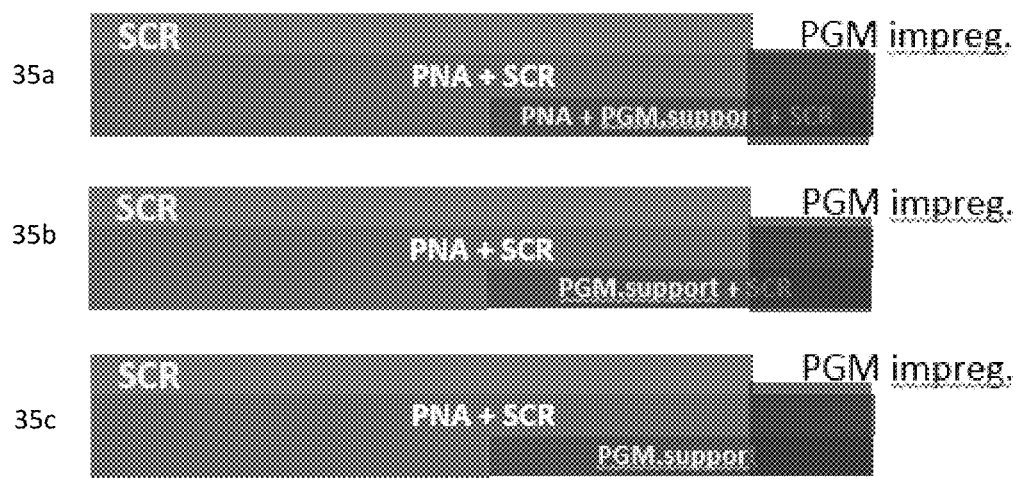

With reference to FIG. 35a, a catalytic article may include a combination of an SCR catalyst, a PNA, and a platinum group metal on a support extending from the outlet end towards the inlet end, extending less than the entire length of the substrate. A combination of a PNA and an SCR catalyst extends the entire length of the substrate, covering the combination of the SCR catalyst, PNA, and platinum group metal on a support. An SCR catalyst extends from the inlet end towards the outlet end, extending less than the entire length of the substrate, partially covering the combination of the PNA and SCR catalyst. A platinum group metal is impregnated on the combination of the PNA and SCR catalyst and the combination of the SCR catalyst, PNA, and platinum group metal on a support at the outlet end of the substrate.

With reference to FIG. 35b, a catalytic article may include a combination of an SCR catalyst and a platinum group metal on a support extending from the outlet end towards the inlet end, extending less than the entire length of the substrate. A combination of a PNA and an SCR catalyst extends the entire length of the substrate, covering the combination of the SCR catalyst and platinum group metal on a support. An SCR catalyst extends from the inlet end towards the outlet end, extending less than the entire length of the substrate, partially covering the combination of the PNA and SCR catalyst. A platinum group metal is impregnated on the combination of the PNA and SCR catalyst and the combination of the SCR catalyst and platinum group metal on a support at the outlet end of the substrate.

With reference to FIG. 35c, a catalytic article may include a platinum group metal on a support extending from the outlet end towards the inlet end, extending less than the entire length of the substrate. A combination of a PNA and an SCR catalyst extends the entire length of the substrate, covering the platinum group metal on a support. An SCR catalyst extends from the inlet end towards the outlet end, extending less than the entire length of the substrate, partially covering the combination of the PNA and SCR catalyst. A platinum group metal is impregnated on the combination of the PNA and SCR catalyst and the platinum group metal on a support at the outlet end of the substrate.

Figure 36:
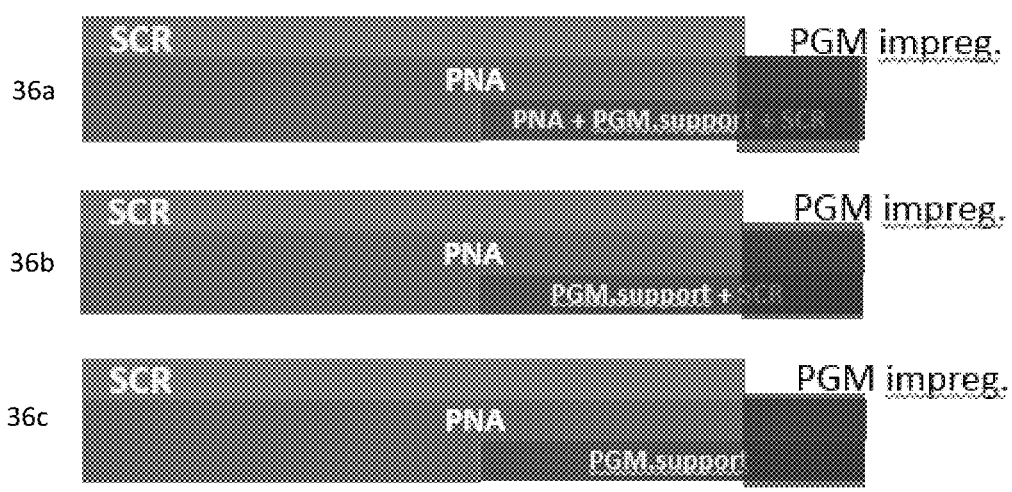

With reference to FIG. 36a, a catalytic article may include a combination of an SCR catalyst, a PNA, and a platinum group metal on a support extending from the outlet end towards the inlet end, extending less than the entire length of the substrate. A PNA extends the entire length of the substrate, covering the combination of the SCR catalyst, PNA, and platinum group metal on a support. An SCR catalyst extends from the inlet end towards the outlet end, extending less than the entire length of the substrate, partially covering the PNA. A platinum group metal is impregnated on the PNA and the combination of the SCR catalyst, PNA, and platinum group metal on a support at the outlet end of the substrate.

With reference to FIG. 36b, a catalytic article may include a combination of an SCR catalyst and a platinum group metal on a support extending from the outlet end towards the inlet end, extending less than the entire length of the substrate. A PNA extends the entire length of the substrate, covering the combination of the SCR catalyst and platinum group metal on a support. An SCR catalyst extends from the inlet end towards the outlet end, extending less than the entire length of the substrate, partially covering the PNA. A platinum group metal is impregnated on the PNA and the combination of the SCR catalyst and platinum group metal on a support at the outlet end of the substrate.

With reference to FIG. 36c, a catalytic article may include a platinum group metal on a support extending from the outlet end towards the inlet end, extending less than the entire length of the substrate. A PNA extends the entire length of the substrate, covering the platinum group metal on a support. An SCR catalyst extends from the inlet end towards the outlet end, extending less than the entire length of the substrate, partially covering the PNA. A platinum group metal is impregnated on the PNA and the platinum group metal on a support at the outlet end of the substrate.

Figure 37:
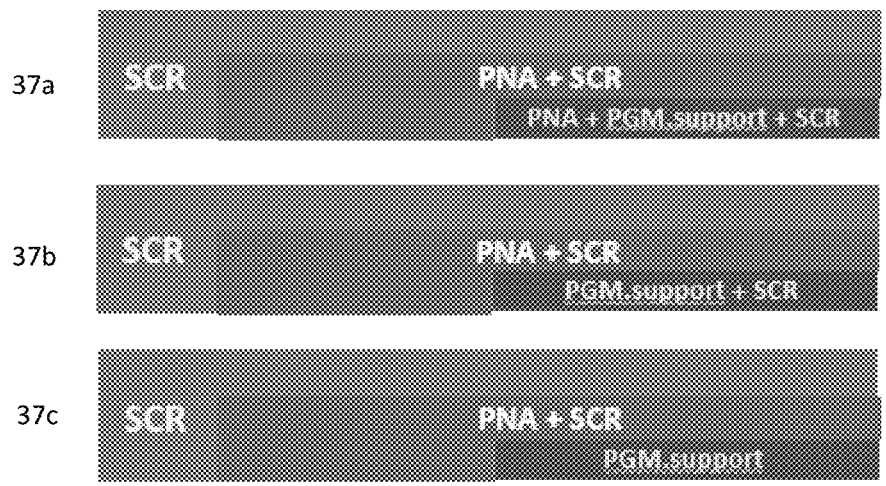

With reference to FIG. 37a, a catalytic article may include a combination of an SCR catalyst, a PNA, and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst, PNA, and platinum group metal on a support. The PNA/SCR combination may be longer in length than the combination of SCR/PNA/PGM.support layer. An SCR catalyst extends the entire length of the substrate, covering the combination of the PNA and SCR catalyst.

With reference to FIG. 37b, a catalytic article may include a combination of an SCR catalyst and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst and platinum group metal on a support. The PNA/SCR combination may be longer in length than the combination of SCR/PGM.support layer. An SCR catalyst extends the entire length of the substrate, covering the combination of the PNA and SCR catalyst.

With reference to FIG. 37c, a catalytic article may include a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the platinum group metal on a support. The PNA/SCR combination may be longer in length than the platinum group metal on a support. An SCR catalyst extends the entire length of the substrate, covering the combination of the PNA and SCR catalyst.

Figure 38:
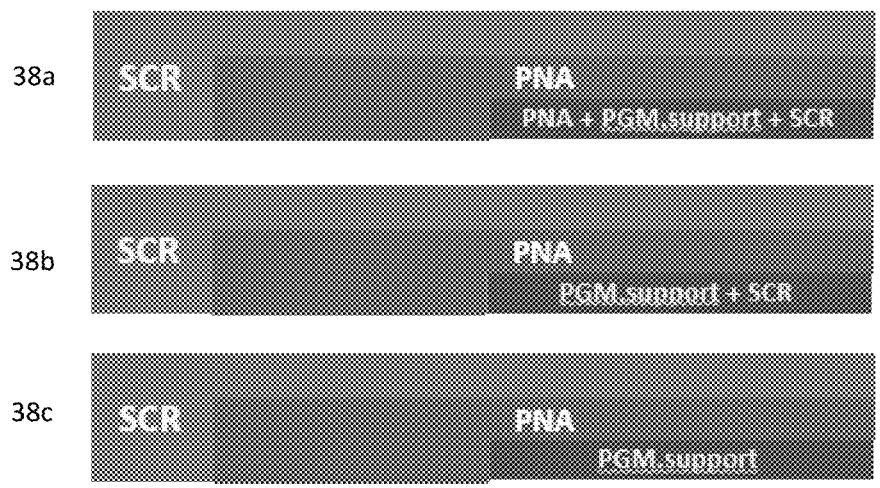

With reference to FIG. 38a, a catalytic article may include a combination of an SCR catalyst, a PNA, and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst, PNA, and platinum group metal on a support. The PNA may be longer in length than the combination of SCR/PNA/PGM.support layer. An SCR catalyst extends the entire length of the substrate, covering the PNA.

With reference to FIG. 38b, a catalytic article may include a combination of an SCR catalyst and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst and platinum group metal on a support. The PNA may be longer in length than the combination of SCR/PGM.support layer. An SCR catalyst extends the entire length of the substrate, covering the PNA.

With reference to FIG. 38c, a catalytic article may include a platinum group metal on a support extending from the outlet end towards the inlet end, extending less than the entire length of the substrate. A PNA extends from the outlet end toward the inlet end, extending less than the entire length of the substrate, and covering the platinum group metal on a support. The PNA may be longer in length than the platinum group metal on a support. An SCR catalyst extends the entire length of the substrate, covering the PNA.

Figure 39:
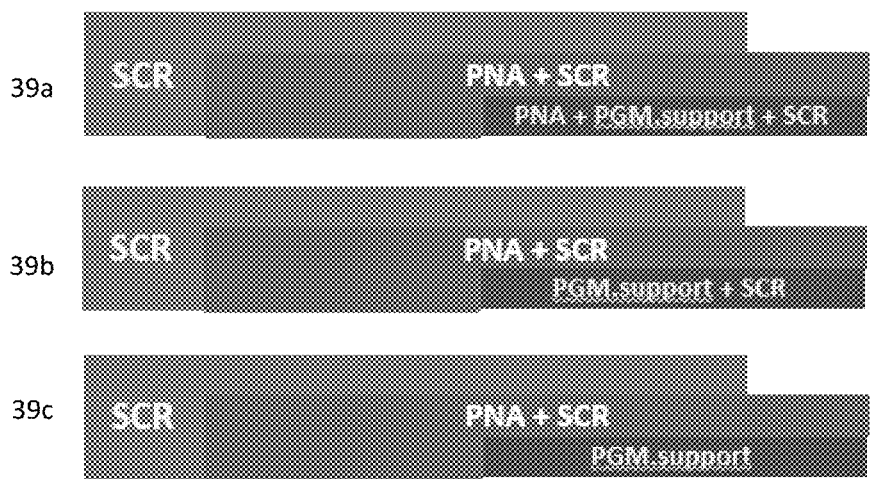

With reference to FIG. 39a, a catalytic article may include a combination of an SCR catalyst, a PNA, and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst, PNA, and platinum group metal on a support. The PNA/SCR combination may be longer in length than the combination of SCR/PNA/PGM.support layer. An SCR catalyst extends from the inlet end towards the outlet end, extending less than the entire length of the substrate, partially covering the combination of the PNA and SCR catalyst.

With reference to FIG. 39b, a catalytic article may include a combination of an SCR catalyst and a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the combination of the SCR catalyst and platinum group metal on a support. The PNA/SCR combination may be longer in length than the combination of SCR/PGM.support layer. An SCR catalyst extends from the inlet end towards the outlet end, extending less than the entire length of the substrate, partially covering the combination of the PNA and SCR catalyst.

With reference to FIG. 39c, a catalytic article may include a platinum group metal on a support extending from the outlet end towards the inlet end, extending less than the entire length of the substrate. A combination of a PNA and an SCR catalyst extends from the outlet end toward the inlet end, extending less than the entire length of the substrate, and covering the platinum group metal on a support. The PNA/SCR combination may be longer in length than the platinum group metal on a support. An SCR catalyst extends from the inlet end towards the outlet end, extending less than the entire length of the substrate, partially covering the combination of the PNA and SCR catalyst.

Figure 40:
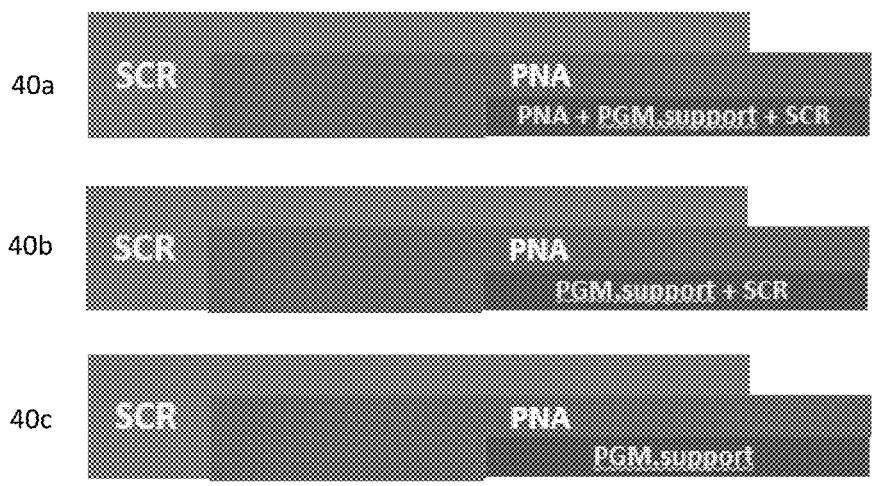

With reference to FIG. 40a, a catalytic article may include a combination of an SCR catalyst, a PNA, and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst, PNA, and platinum group metal on a support. The PNA may be longer in length than the combination of SCR/PNA/PGM.support layer. An SCR catalyst extends from the inlet end towards the outlet end, extending less than the entire length of the substrate, partially covering the PNA.

With reference to FIG. 40b, a catalytic article may include a combination of an SCR catalyst and a platinum group metal on a support extending from the outlet end towards the inlet end, extending less than the entire length of the substrate. A PNA extends from the outlet end toward the inlet end, extending less than the entire length of the substrate, and covering the combination of the SCR catalyst and platinum group metal on a support. The PNA may be longer in length than the combination of SCR/PGM.support layer. An SCR catalyst extends from the inlet end towards the outlet end, extending less than the entire length of the substrate, partially covering the PNA.

With reference to FIG. 40c, a catalytic article may include a platinum group metal on a support extending from the outlet end towards the inlet end, extending less than the entire length of the substrate. A PNA extends from the outlet end toward the inlet end, extending less than the entire length of the substrate, and covering the platinum group metal on a support. The PNA may be longer in length than the platinum group metal on a support. An SCR catalyst extends from the inlet end towards the outlet end, extending less than the entire length of the substrate, partially covering the PNA.

Figure 41:
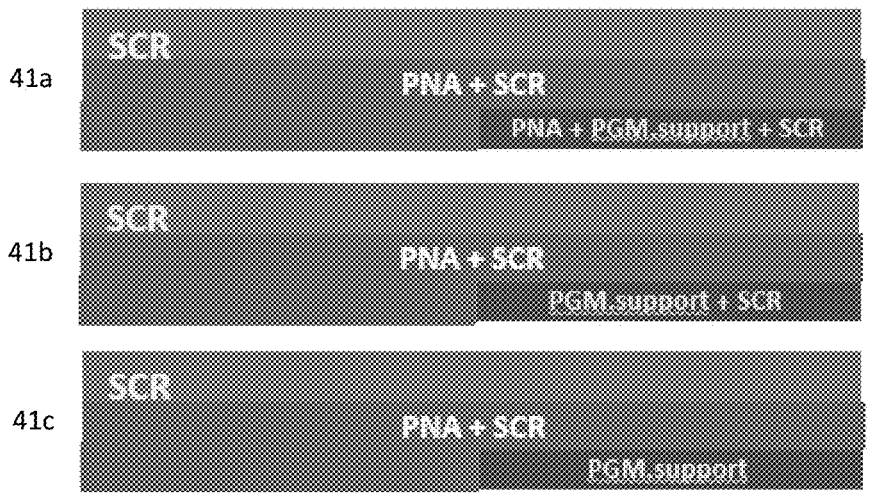

With reference to FIG. 41a, a catalytic article may include a combination of an SCR catalyst, a PNA, and a platinum group metal on a support extending from the outlet end towards the inlet end, extending less than the entire length of the substrate. A combination of a PNA and an SCR catalyst extends the entire length of the substrate, covering the combination of the SCR catalyst, PNA, and platinum group metal on a support. An SCR catalyst extends the entire length of the substrate, covering the combination of the PNA and SCR catalyst.

With reference to FIG. 41b, a catalytic article may include a combination of an SCR catalyst and a platinum group metal on a support extending from the outlet end towards the inlet end, extending less than the entire length of the substrate. A combination of a PNA and an SCR catalyst extends the entire length of the substrate, covering the combination of the SCR catalyst and platinum group metal on a support. An SCR catalyst extends the entire length of the substrate, covering the combination of the PNA and SCR catalyst.

With reference to FIG. 41c, a catalytic article may include a platinum group metal on a support extending from the outlet end towards the inlet end, extending less than the entire length of the substrate. A combination of a PNA and an SCR catalyst extends the entire length of the substrate, covering the platinum group metal on a support. An SCR catalyst extends the entire length of the substrate, covering the combination of the PNA and SCR catalyst.

Figure 42:
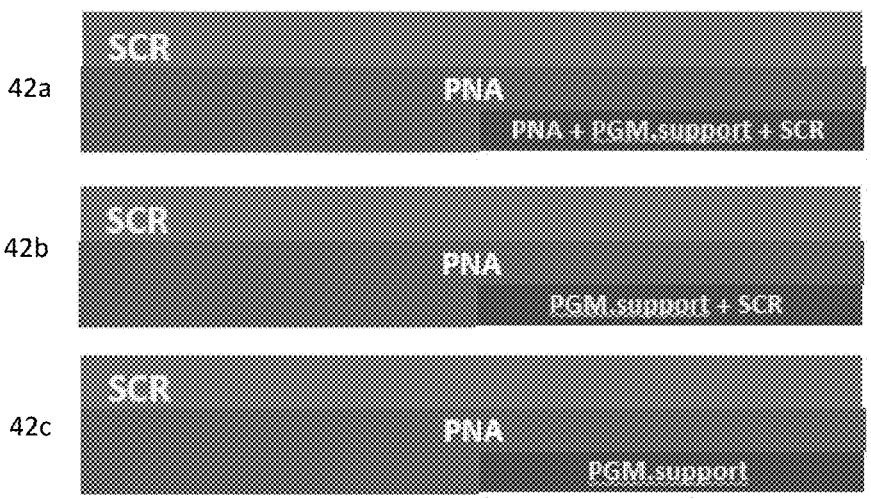

With reference to FIG. 42a, a catalytic article may include a combination of an SCR catalyst, a PNA, and a platinum group metal on a support extending from the outlet end towards the inlet end, extending less than the entire length of the substrate. A PNA extends the entire length of the substrate, covering the combination of the SCR catalyst, PNA, and platinum group metal on a support. An SCR catalyst extends the entire length of the substrate, covering the PNA.

With reference to FIG. 42b, a catalytic article may include a combination of an SCR catalyst and a platinum group metal on a support extending from the outlet end towards the inlet end, extending less than the entire length of the substrate. A PNA extends the entire length of the substrate, covering the combination of the SCR catalyst and platinum group metal on a support. An SCR catalyst extends the entire length of the substrate, covering the PNA.

With reference to FIG. 42c, a catalytic article may include a platinum group metal on a support extending from the outlet end towards the inlet end, extending less than the entire length of the substrate.

A PNA extends the entire length of the substrate, covering the platinum group metal on a support. An SCR catalyst extends the entire length of the substrate, covering the PNA.

Figure 43:
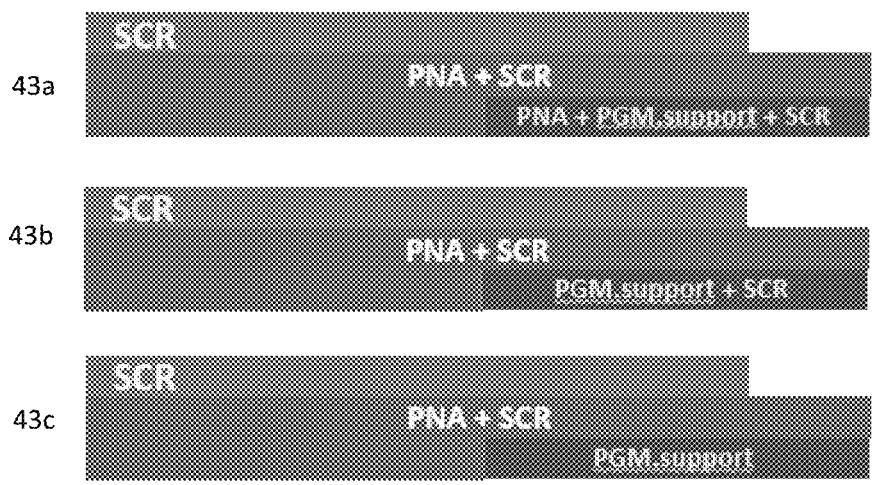

With reference to FIG. 43a, a catalytic article may include a combination of an SCR catalyst, a PNA, and a platinum group metal on a support extending from the outlet end towards the inlet end, extending less than the entire length of the substrate. A combination of a PNA and an SCR catalyst extends the entire length of the substrate, covering the combination of the SCR catalyst, PNA, and platinum group metal on a support. An SCR catalyst extends from the inlet end towards the outlet end, extending less than the entire length of the substrate, partially covering the combination of the PNA and SCR catalyst.

With reference to FIG. 43b, a catalytic article may include a combination of an SCR catalyst and a platinum group metal on a support extending from the outlet end towards the inlet end, extending less than the entire length of the substrate. A combination of a PNA and an SCR catalyst extends the entire length of the substrate, and covering the combination of the SCR catalyst and platinum group metal on a support. An SCR catalyst extends from the inlet end towards the outlet end, extending less than the entire length of the substrate, partially covering the combination of the PNA and SCR catalyst.

With reference to FIG. 43c, a catalytic article may include a platinum group metal on a support extending from the outlet end towards the inlet end, extending less than the entire length of the substrate. A combination of a PNA and an SCR catalyst extends the entire length of the substrate, and covering the platinum group metal on a support. An SCR catalyst extends from the inlet end towards the outlet end, extending less than the entire length of the substrate, partially covering the combination of the PNA and SCR catalyst.

Figure 44:
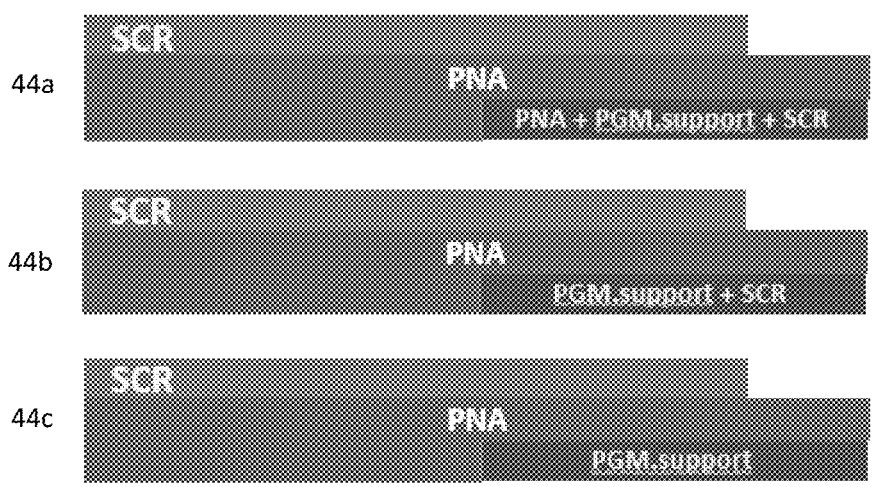

With reference to FIG. 44a, a catalytic article may include a combination of an SCR catalyst, a PNA, and a platinum group metal on a support extending from the outlet end towards the inlet end, extending less than the entire length of the substrate. A PNA extends from the entire length of the substrate, covering the combination of the SCR catalyst, PNA, and platinum group metal on a support. An SCR catalyst extends from the inlet end towards the outlet end, extending less than the entire length of the substrate, partially covering the PNA.

With reference to FIG. 44b, a catalytic article may include a combination of an SCR catalyst and a platinum group metal on a support extending from the outlet end towards the inlet end, extending less than the entire length of the substrate. A PNA extends the entire length of the substrate, covering the combination of the SCR catalyst and platinum group metal on a support. An SCR catalyst extends from the inlet end towards the outlet end, extending less than the entire length of the substrate, partially covering the PNA.

With reference to FIG. 44c, a catalytic article may include a platinum group metal on a support extending from the outlet end towards the inlet end, extending less than the entire length of the substrate. A PNA extends the entire length of the substrate, covering the platinum group metal on a support. An SCR catalyst extends from the inlet end towards the outlet end, extending less than the entire length of the substrate, partially covering the PNA.

System Configurations

System configurations of the present invention may an upstream SCR catalyst, and a catalytic article having a two- or three-zone configuration as described in the preceding sections. The upstream SCR catalyst may be located upstream of the catalytic article having a two- or three-zone configuration as described in the preceding sections; in some embodiments, the upstream SCR catalyst and the catalytic article may be close-coupled. In some embodiments, the upstream SCR catalyst and the catalytic article are located on a single substrate, with the upstream SCR catalyst located upstream of the first and second (and third, if present) zones of the catalytic article.

In some embodiments, the system includes an SCR catalyst located downstream of the catalytic article having a two- or three-zoned configuration as described above. In some embodiments, a system may also include a filter.

The system may include one or more reductant injectors, for example, upstream of any SCR catalyst in the system. In some embodiments, the system includes a reductant injector upstream of the SCR catalyst and/or the catalytic article having a two- or three-zone configuration as described above. In a system having a downstream SCR catalyst, a reductant injector may be included upstream of the downstream SCR catalyst.

Ammonia Oxidation Catalyst

Catalyst articles of the present invention may include one or more ammonia oxidation catalysts, also called an ammonia slip catalyst ("ASC"). One or more ASC may be included with or downstream from an SCR catalyst, to oxidize excess ammonia and prevent it from being released to the atmosphere. In some embodiments the ASC may be included on the same substrate as an SCR catalyst, or blended with an SCR catalyst. In certain embodiments, the ammonia oxidation catalyst material may be selected to favor the oxidation of ammonia instead of the formation of $NO_x$ or $N_2O$. Preferred catalyst materials include platinum, palladium, or a combination thereof. The ammonia oxidation catalyst may comprise platinum and/or palladium supported on a metal oxide. In some embodiments, the catalyst is disposed on a high surface area support, including but not limited to alumina.

In some embodiments, the ammonia oxidation catalyst comprises a platinum group metal on a siliceous support. A siliceous material may include a material such as: (1) silica; (2) a zeolite with a silica-to-alumina ratio of at least 200; and (3) amorphous silica-doped alumina with $SiO2$ content ≥40%. In some embodiments, a siliceous material may include a material such as a zeolite with a silica-to-alumina ratio of at least 200; at least 250; at least 300; at least 400; at least 500; at least 600; at least 750; at least 800; or at least 1000. In some embodiments, a platinum group metal is present on the support in an amount of about 0.5 wt % to about 10 wt % of the total weight of the platinum group metal and the support; about 1 wt % to about 6 wt % of the total weight of the platinum group metal and the support; about 1.5 wt % to about 4 wt % of the total weight of the platinum group metal and the support; about 10 wt % of the total weight of the platinum group metal and the support; about 0.5 wt % of the total weight of the platinum group metal and the support; about 1 wt % of the total weight of the platinum group metal and the support; about 2 wt % of the total weight of the platinum group metal and the support; about 3 wt % of the total weight of the platinum group metal and the support; about 4 wt % of the total weight of the platinum group metal and the support; about 5 wt % of the total weight of the platinum group metal and the support; about 6 wt % of the total weight of the platinum group metal and the support; about 7 wt % of the total weight of the platinum group metal and the support; about 8 wt % of the total weight of the platinum group metal and the support; about 9 wt % of the total weight of the platinum group metal and the support; or about 10 wt % of the total weight of the platinum group metal and the support.

In some embodiments, the siliceous support can comprise a molecular sieve having a BEA, CDO, CON, FAU, MEL, MFI or MWW Framework Type.

SCR Catalyst

Systems of the present invention may include one or more SCR catalyst. In some embodiments, a catalyst article may include a first SCR catalyst, a second SCR catalyst, and/or a third SCR catalyst. In some embodiments, the SCR catalysts may comprise the same formulation as each other. In some embodiments, the SCR catalysts may comprise different formulations than each other.

The exhaust system of the invention may include an SCR catalyst which is positioned downstream of an injector for introducing ammonia or a compound decomposable to ammonia into the exhaust gas. The SCR catalyst may be positioned directly downstream of the injector for injecting ammonia or a compound decomposable to ammonia (e.g. there is no intervening catalyst between the injector and the SCR catalyst).

The SCR catalyst includes a substrate and a catalyst composition. The substrate may be a flow-through substrate or a filtering substrate. When the SCR catalyst has a flow-through substrate, then the substrate may comprise the SCR catalyst composition (i.e. the SCR catalyst is obtained by extrusion) or the SCR catalyst composition may be disposed or supported on the substrate (i.e. the SCR catalyst composition is applied onto the substrate by a washcoating method).

When the SCR catalyst has a filtering substrate, then it is a selective catalytic reduction filter catalyst, which is referred to herein by the abbreviation "SCRF". The SCRF comprises a filtering substrate and the selective catalytic reduction (SCR) composition. References to use of SCR catalysts throughout this application are understood to include use of SCRF catalysts as well, where applicable.

The selective catalytic reduction composition may comprise, or consist essentially of, a metal oxide based SCR catalyst formulation, a molecular sieve based SCR catalyst formulation, or mixture thereof. Such SCR catalyst formulations are known in the art.

The selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

The metal oxide based SCR catalyst formulation may comprise, or consist essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt % (e.g. of the metal oxide based SCR formulation) and/or the concentration of the oxide of tungsten (e.g. $WO_3$) is from 5 to 20 wt %. More preferably, the oxide of vanadium (e.g. $V_2O_5$) and the oxide of tungsten (e.g. $WO_3$) are supported on titania (e.g. $TiO_2$).

When the refractory oxide is ceria (e.g. $CeO_2$), then preferably the concentration of the oxide of vanadium is from 0.1 to 9 wt % (e.g. of the metal oxide based SCR formulation) and/or the concentration of the oxide of tungsten (e.g. $WO_3$) is from 0.1 to 9 wt %.

The metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$).

The selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200), 10 to 100 (e.g. 10 to 30 or 20 to 80), such as 12 to 40, or 15 to 30. In some embodiments, a suitable molecular sieve has a SAR of >200; >600; or >1200. In some embodiments, the molecular sieve has a SAR of from about 1500 to about 2100.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium.

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve). Systems and method of the present invention may include any type of SCR catalyst, however, SCR catalysts including copper ("Cu—SCR catalysts") may experience more notable benefits from systems of the present invention, as they are particularly vulnerable to the effects of sulfation. Cu—SCR catalyst formulations may include, for example, Cu exchanged SAPO-34, Cu exchanged CHA zeolite, Cu exchanged AEI zeolites, or combinations thereof.

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

In general, the selective catalytic reduction catalyst comprises the selective catalytic reduction composition in a total concentration of 0.5 to 4.0 g in$^{-3}$, preferably 1.0 to 3.0 4.0 g in$^{-3}$.

The SCR catalyst composition may comprise a mixture of a metal oxide based SCR catalyst formulation and a molecular sieve based SCR catalyst formulation. The (a) metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation may comprise a transition metal exchanged molecular sieve.

When the SCR catalyst is an SCRF, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general for an SCRF, the selective catalytic reduction composition is disposed within the wall of the wall-flow filter substrate monolith. Additionally, the selective catalytic reduction composition may be disposed on the walls of the inlet channels and/or on the walls of the outlet channels.

Blend

Embodiments of the present invention may include a blend of (1) a platinum group metal on a support, and (2) an SCR catalyst. In some embodiments, within the blend, a weight ratio of the SCR catalyst to the platinum group metal on a support is about 3:1 to about 300:1; about 3:1 to about 250:1; about 3:1 to about 200:1; about 4:1 to about 150:1; about 5:1 to about 100:1; about 6:1 to about 90:1; about 7:1 to about 80:1; about 8:1 to about 70:1; about 9:1 to about 60:1; about 10:1 to about 50:1; about 3:1; about 4:1; about 5:1; about 6:1; about 7:1; about 8:1; about 9:1; about 10:1; about 15:1; about 20:1; about 25:1; about 30:1; about 40:1; about 50:1; about 75:1; about 100:1; about 125:1; about 150:1; about 175:1; about 200:1; about 225:1; about 250:1; about 275:1; or about 300:1. This weight ratio may include platinum group metal from the PNA as well, in embodiments where the blend includes PNA.

NOx ADSORBER (PNA)

The NOx adsorber (PNA) comprises a metal-containing molecular sieve or palladium on ceria. When the PNA comprises a metal-containing molecular sieve, the metal may be selected from the group consisting of cerium, chromium, cobalt, copper, iron, lanthanum, manganese, molybdenum, nickel, niobium, palladium, tungsten, silver vanadium, and zinc, and mixtures thereof. In some embodiments, the metal is cobalt, manganese, palladium, or zinc. In some embodiments, the metal is palladium or zinc. In some embodiments, the metal in the SCR catalyst is copper and the metal in the PNA is palladium. The molecular sieve in the metal-containing molecular sieve in the PNA can comprise an aluminosilicate (e.g. zeolite), an aluminophosphate, or a silicoaluminophosphate, as described above in the description of molecular sieves in SCR catalysts. When the SCR catalyst comprises a metal-containing molecular sieve, the molecular sieve in the metal-containing molecular sieve in the SCR catalyst can be the same molecular sieve in the metal-containing molecular sieve in the PNA, or the molecular sieve in the metal-containing molecular sieve in the SCR catalyst can be the different than the molecular sieve in the metal-containing molecular sieve in the PNA. In some embodiments, a same formulation and/or component may function as both a PNA and an SCR catalyst.

The molecular sieve in the metal-containing molecular sieve in the PNA can be a small-pore, a medium-pore or a large-pore molecular sieve, as described above in the SCR catalyst. The molecular sieve in the metal-containing molecular sieve in the PNA is preferably a small pore molecular sieve, as described above in the SCR catalyst. The small pore molecular sieve can comprise a Framework Type selected from the group consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SIV, THO, TSC, UEI, UFI, VNI, YUG, and ZON, and mixtures or intergrowths thereof. Preferably the small pore molecular sieve is a chabazite (CHA) or an AEI. Preferred medium pore molecular sieves include FER, MEL, MFI and STT. Preferred large pore molecular sieves include AFI, BEA, MAZ, MOR and OFF. Preferably the molecular sieve in the metal-containing molecular sieve comprises an aluminosilicate or an aluminophosphate having an SAR from 5 to 100, inclusive. When the palladium containing molecular sieve is a palladium containing silicoaluminophosphate, preferably the silicoaluminophosphate comprises between 5% and 15%, inclusive, of silica.

The metal in the PNA can be present at a concentration of 0.01 to 20 wt. %. The metal-containing molecular sieve can be present in the catalyst article at a concentration of about 0.5 to about 4.0 g/in$^3$.

Mixture of SCR Catalyst and NO$_X$ Adsorber Catalyst

Catalyst articles of the present invention may include a mixture of an SCR catalyst with a NOx adsorber catalyst (PNA). In some embodiments, the mixture may also include an ASC, such as when the PNA is included in the SCR/ASC blend.

In some embodiments, a catalyst article can comprise an SCR catalyst and a PNA, where the SCR catalyst comprises a metal-containing molecular sieve, where the metal is selected from the group consisting of cerium, copper, iron, and manganese, and mixtures thereof, and the PNA comprises a metal-containing molecular sieve, wherein the metal is selected from the group consisting of palladium or silver, and mixtures thereof, wherein the SCR catalyst and the PNA comprise the same molecular sieve and both the metal of the SCR catalyst and the metal of the PNA are exchanged and/or substituted in the molecular sieve.

In some embodiments, the molecular sieve in the metal-containing molecular sieve in the SCR catalyst and the PNA can comprise an aluminosilicate, an aluminophosphate, or a silicoaluminophosphate. The molecular sieve in the metal-containing molecular sieve in the PNA is preferably a small pore molecular sieve. In some embodiments, the molecular sieve in the metal-containing molecular sieve in PNA comprises a Framework Type selected from the group consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SIV, THO, TSC, UEI, UFI, VNI, YUG, and ZON, and mixtures or intergrowths thereof. In some embodiments, the molecular sieve comprises an AEI or CHA Framework Type.

A method of preparing a catalyst article comprising an SCR catalyst and a PNA, where the SCR catalyst comprises a metal-containing molecular sieve, where the metal is selected from the group consisting of cerium, copper, iron, and manganese, and mixtures thereof, and the PNA comprises a metal-containing molecular sieve, where the metal is selected from the group consisting of palladium or silver, and mixtures thereof, where the SCR catalyst and the PNA comprise the same molecular sieve and both the metal of the SCR catalyst and the metal of PNA catalyst are exchanged and/or substituted in the molecular sieve is described. In some embodiments, the method comprises: (a) adding a first metal selected from the group selected from the group consisting of cerium, copper, iron, and manganese, and mixtures thereof, to a molecular sieve to form a molecular sieve containing the first metal; (b) calcining the molecular sieve containing the first metal to form a first calcined molecular sieve; (c) adding a second metal selected from the group selected from the group consisting of palladium or silver, and mixtures thereof, to the first calcined molecular sieve to form a molecular sieve containing the first metal and the second metal; and (d) calcining the molecular sieve containing the first metal and the second metal. The method can further comprise steps (a1) and (c1), where step (a1) comprises drying the molecular sieve containing the first metal and step (c1) comprises drying the molecular sieve containing the first metal and the second metal. Steps (a) and (c), adding the first and second metal, can be performed by one or more of impregnation, adsorption, ion-exchange, incipient wetness, precipitation, spray drying or the like.

A catalyst article can comprise an SCR catalyst and a PNA having the compositions described above, where: (a) when the molecular sieve in the NOx adsorber catalyst is the same as the molecular sieve in a metal-containing molecular sieve in the SCR catalyst, the metal in the NOx adsorber catalyst and the metal in the SCR catalyst are in combination with the molecular sieve or (b) when the molecular sieve in the NOx adsorber catalyst is different than the molecular sieve in a metal-containing molecular sieve in the SCR catalyst, the metal in the NOx adsorber catalyst is in a first combination with the molecular sieve in the NOx adsorber catalyst, the metal in the SCR catalyst is in a second combination with the molecular sieve in the SCR catalyst and the first combination and the second combination are present in a third combination. Preferably, the metal in the PNA is palladium. In some embodiments, the metal in the SCR catalyst is copper, the metal in the PNA is palladium and the molecular sieve is a chabazite or an AEI. Palladium can be in introduced into the molecular sieve by spray drying or by impregnating with Pd nitrate. The molecular sieve can be hydrothermally aged. The catalyst article can further comprise hydrocarbon-SCR activity. The catalyst article can reduce stored NOx by hydrocarbon SCR. In some embodiments, the copper loading is between 0.1 and 10.0 wt. %, based on the total weight of the article. In some embodiments, the palladium loading is between 0.01 and 20.0 wt. %, based on the total weight of the article.

In embodiments where the SCR catalyst and PNA are combined, the SCR catalyst and PNA are present in a weight ratio of about 10:1 to about 1:10; about 9:1 to about 1:9; about 8:1 to about 1:8; about 7:1 to about 1:7; about 6:1 to about 1:6; about 5:1 to about 1:5; about 4:1 to about 1:4; about 3:1 to about 1:3; about 2:1 to about 1:2; about 10:1; about 9:1; about 8:1; about 7:1; about 6:1; about 5:1; about 4:1; about 3:1; about 2:1; about 1:1; about 1:2; about 1:3; about 1:4: about 1:5; about 1:6; about 1:7; about 1:8; about 1:9; or about 1:10.

DOC

Catalyst articles and systems of the present invention may include one or more diesel oxidation catalysts. Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

Substrate

Catalysts of the present invention may each further comprise a flow-through substrate or filter substrate. In one embodiment, the catalyst may be coated onto the flow-through or filter substrate, and preferably deposited on the flow-through or filter substrate using a washcoat procedure.

The combination of an SCR catalyst and a filter is known as a selective catalytic reduction filter (SCRF catalyst). An SCRF catalyst is a single-substrate device that combines the functionality of an SCR and particulate filter, and is suitable for embodiments of the present invention as desired. Description of and references to the SCR catalyst throughout this application are understood to include the SCRF catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Reductant/Urea Injector

The system may include a means for introducing a nitrogenous reductant into the exhaust system upstream of the SCR and/or SCRF catalyst. It may be preferred that the means for introducing a nitrogenous reductant into the exhaust system is directly upstream of the SCR or SCRF catalyst (e.g. there is no intervening catalyst between the means for introducing a nitrogenous reductant and the SCR or SCRF catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce NOx therein. Preferred control means may include an electronic control unit, optionally an engine control unit, and may additionally comprise a NOx sensor located downstream of the NO reduction catalyst.

Benefits

Catalyst articles of the present invention may provide many benefits, including advantages compared to a catalyst article which is generally equivalent except does not include a PNA. Catalyst articles of the present invention may allow for the reduction or removal of an EGR circuit within an exhaust system, which may be beneficial in improving fuel economy and power output as well as lowering hydrocarbon and particulate matter emissions. Additionally, catalyst articles of the present invention may provide equivalent or near-equivalent NO conversion as compared to an SCR catalyst when the catalyst article is placed in a close-coupled position after the engine. Catalyst articles may provide equivalent or near-equivalent $N_2O$ formation compared to an SCR catalyst during $NH_3$ under-injection. Catalyst articles of the present invention may provide significantly reduced $N_2O$ formation during $NH_3$ over-injection. Catalyst articles of the present invention may be said to behave as an SCR/DOC catalyst under urea under-injection conditions, while behaving as an SCR/ASC/DOC with high $NH_3$ selectivity when excess $NH_3$ is present. Catalyst articles of the present invention may achieve SCR/ASC/DOC functionalities in a single block, which is particularly desirable when space is limited. Additionally, the catalyst articles may provide a fast response to engine thermal swing, which may be beneficial for NOx conversion during a cold start period. The catalyst articles may provide NOx storage before the urea-injection temperature is reached, providing additional cold-start NOx control. In some embodiments, the catalyst article may provide HC storage during cold start.

In some embodiments, because of the fast warm-up of the close-coupled catalyst, the NOx storage capacity of the PNA component can be much lower than the configuration with Engine 4 PNA/DOC→filter→SCR/ASC. In some embodiments, because NOx release and conversion occurs on the same brick, the NOx release temperature of the PNA component may be much lower than the configuration with Engine→PNA/DOC→filter→SCR/ASC In some embodiments, optimal benefit may be derived for a system with the inventive catalyst as the first block when an ammonia:NOx ratio is ≥1 and when a temperature of the exhaust stream entering the catalyst article is ≤180° C. During these conditions, i.e. the cold start period, a downstream SCR/ASC may be too cold to be active. Once the system warms up such that the exhaust stream entering the catalyst article is ≥180° C., the ammonia:NOx ratio of is more optimally >0.5, to allow the catalyst to convert the maximum amount of NOx with minimal amount of $N_2O$ production. During the high ammonia:NOx ratio cold start period and occasional transient $NH_3$ slip event, a catalyst article of the present invention may be able to selectively oxidize excess $NH_3$ to $N_2$ without a separate/additional ASC component.

Catalysts of the present invention may provide excellent SCR and ASC functionalities while being able to store NOx during cold start period and convert released NOx at higher temperatures if $NH_3$ is provided in the feed. This invention may essentially eliminate the temperature gap between NOx release temperature on the PNA catalyst and the necessary temperature for SCR reaction to be active in the downstream SCR catalyst in a PNA/DOC→filter→SCR/ASC system.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

When a range, or ranges, for various numerical elements are provided, the range, or ranges, can include the values, unless otherwise specified.

The term "$N_2$ selectivity" means the percent conversion of ammonia into nitrogen.

The terms "diesel oxidation catalyst" (DOC), "diesel exotherm catalyst" (DEC), "NOx absorber", "SCR/PNA" (selective catalytic reduction/passive NOx adsorber), "cold-start catalyst" (CSC) and "three-way catalyst" (TWC) are well known terms in the art used to describe various types of catalysts used to treat exhaust gases from combustion processes.

The term "platinum group metal" or "PGM" refers to platinum, palladium, ruthenium, rhodium, osmium and iridium. The platinum group metals are preferably platinum, palladium, ruthenium or rhodium.

The terms "downstream" and "upstream" describe the orientation of a catalyst or substrate where the flow of exhaust gas is from the inlet end to the outlet end of the substrate or article.

The following examples merely illustrate the invention; the skilled person will recognize many variations that are within the spirit of the invention and scope of the claims.

Example 1

Figure 45:
FIG. 45 depicts the configurations prepared and tested in Examples 1 and 2.
Figure 45:
Figure 45:
Figure 45:
Figure 46:
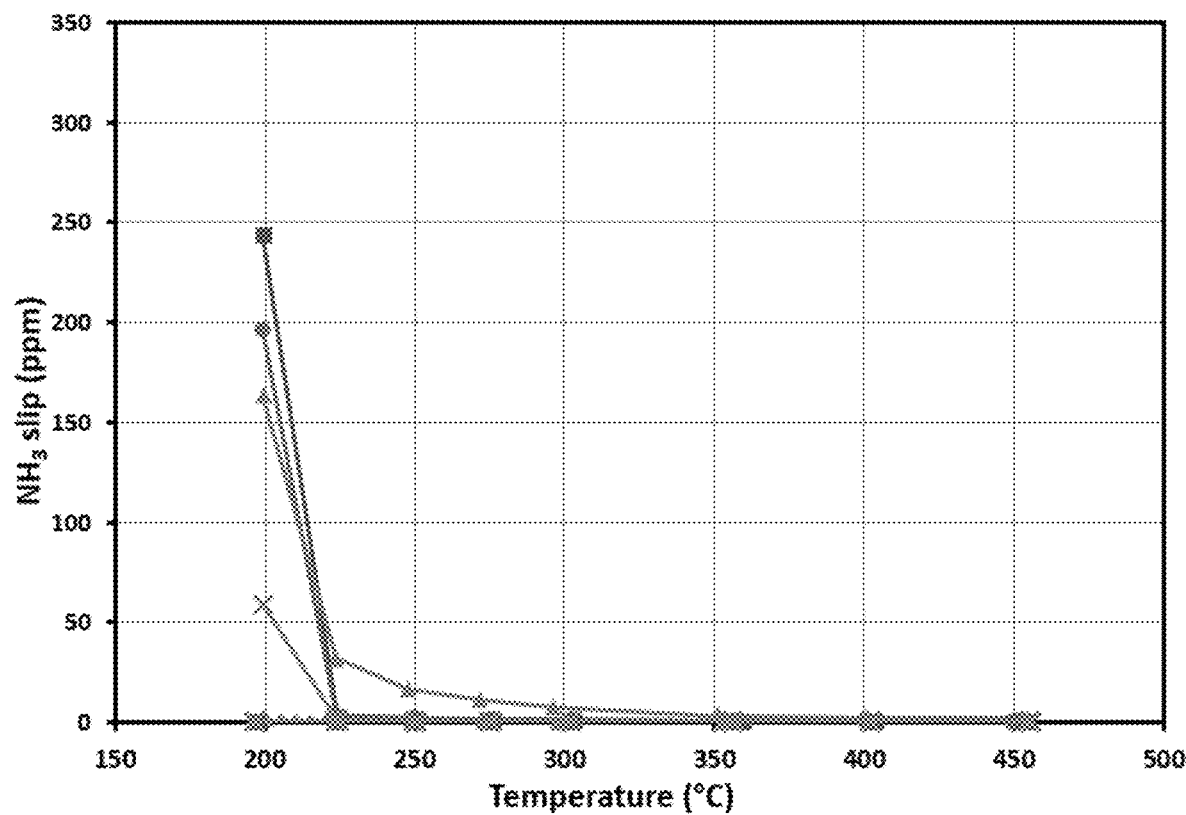
FIG. 46 shows $NH_3$ slip of inventive and reference catalysts.
Figure 47:
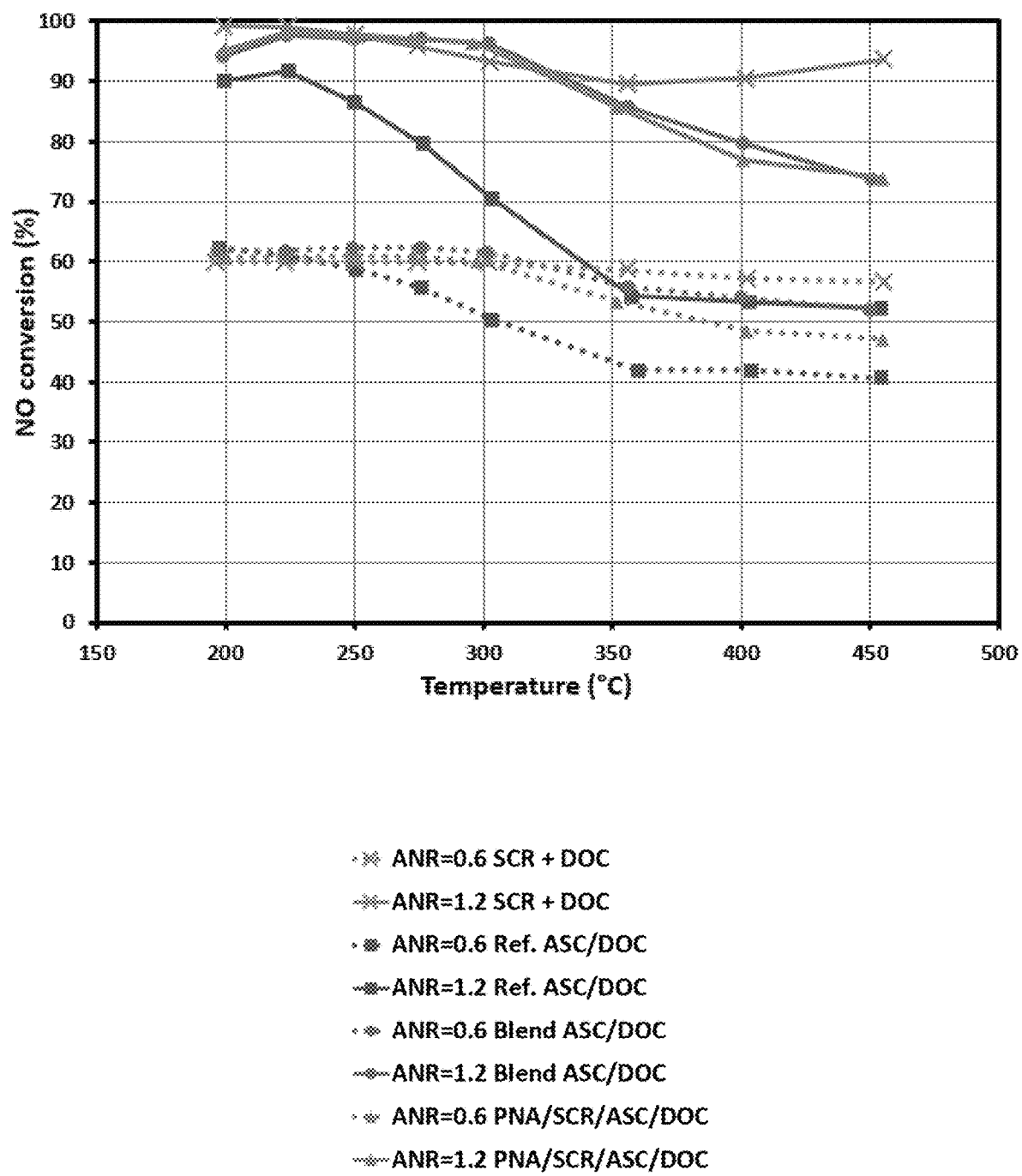
FIG. 47 shows NO conversion of inventive and reference catalysts.
Figure 48:
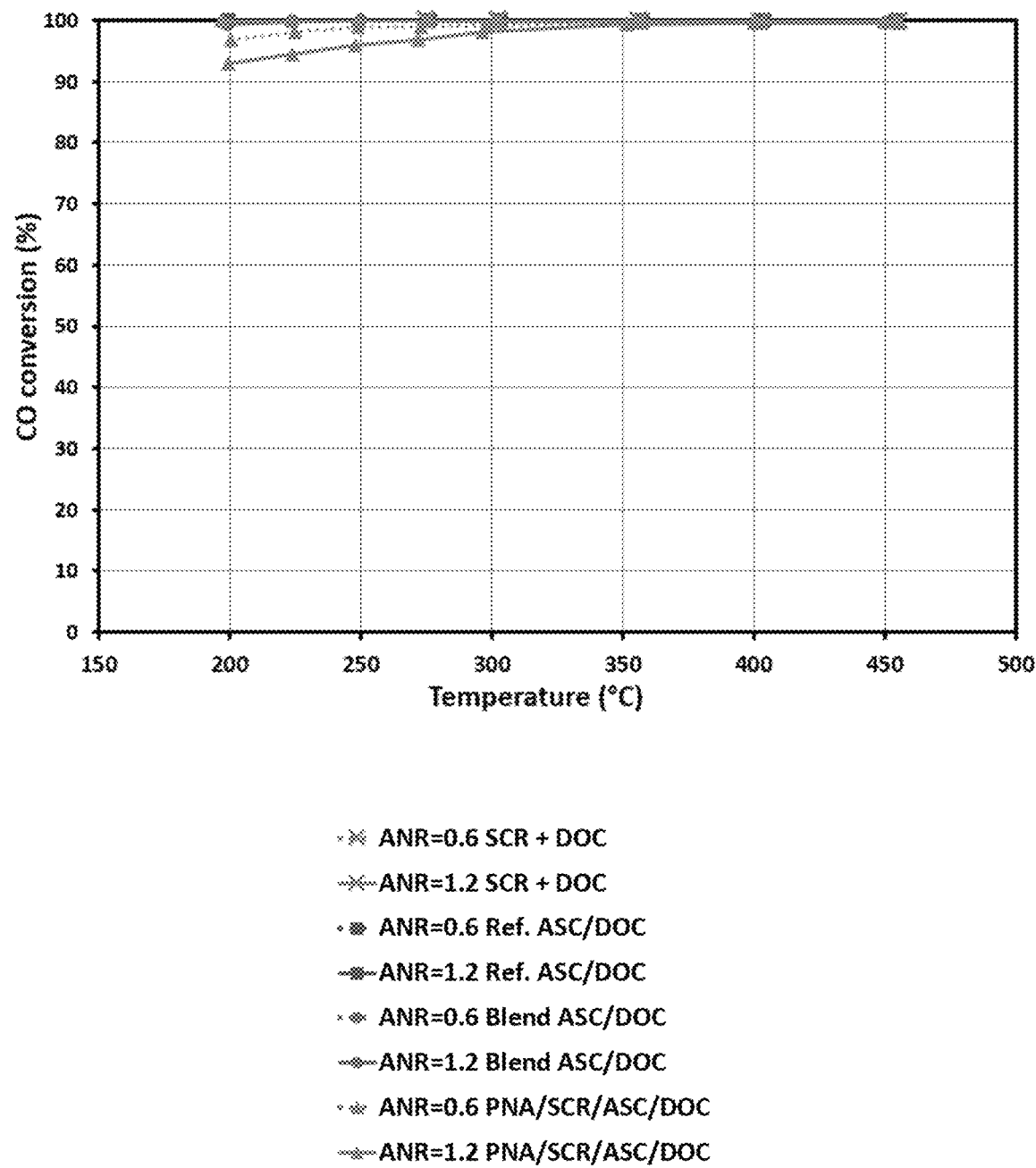
FIG. 48 shows CO conversion of inventive and reference catalysts.
Figure 49:
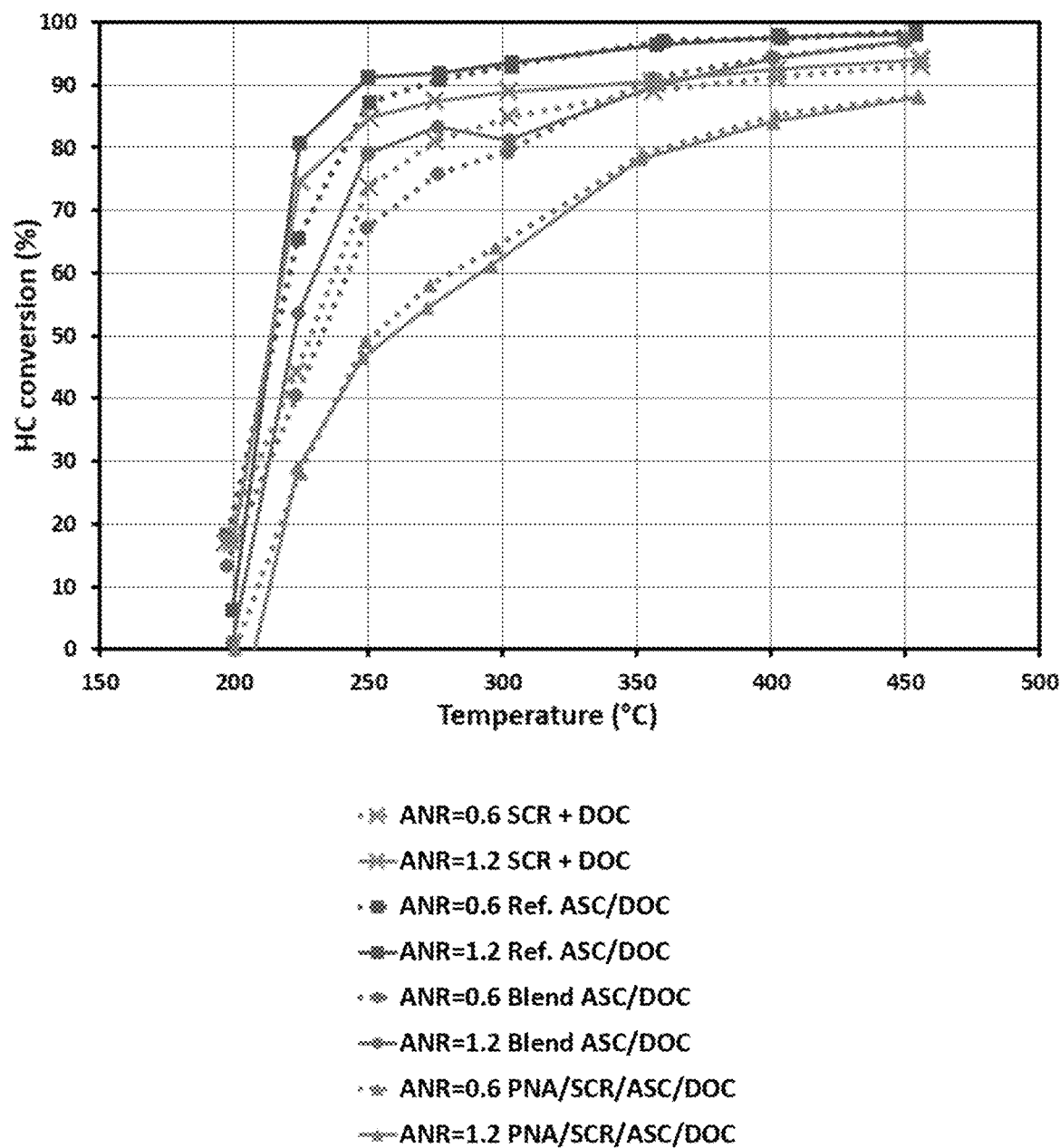
FIG. 49 shows HC conversion of inventive and reference catalysts.
Figure 50:
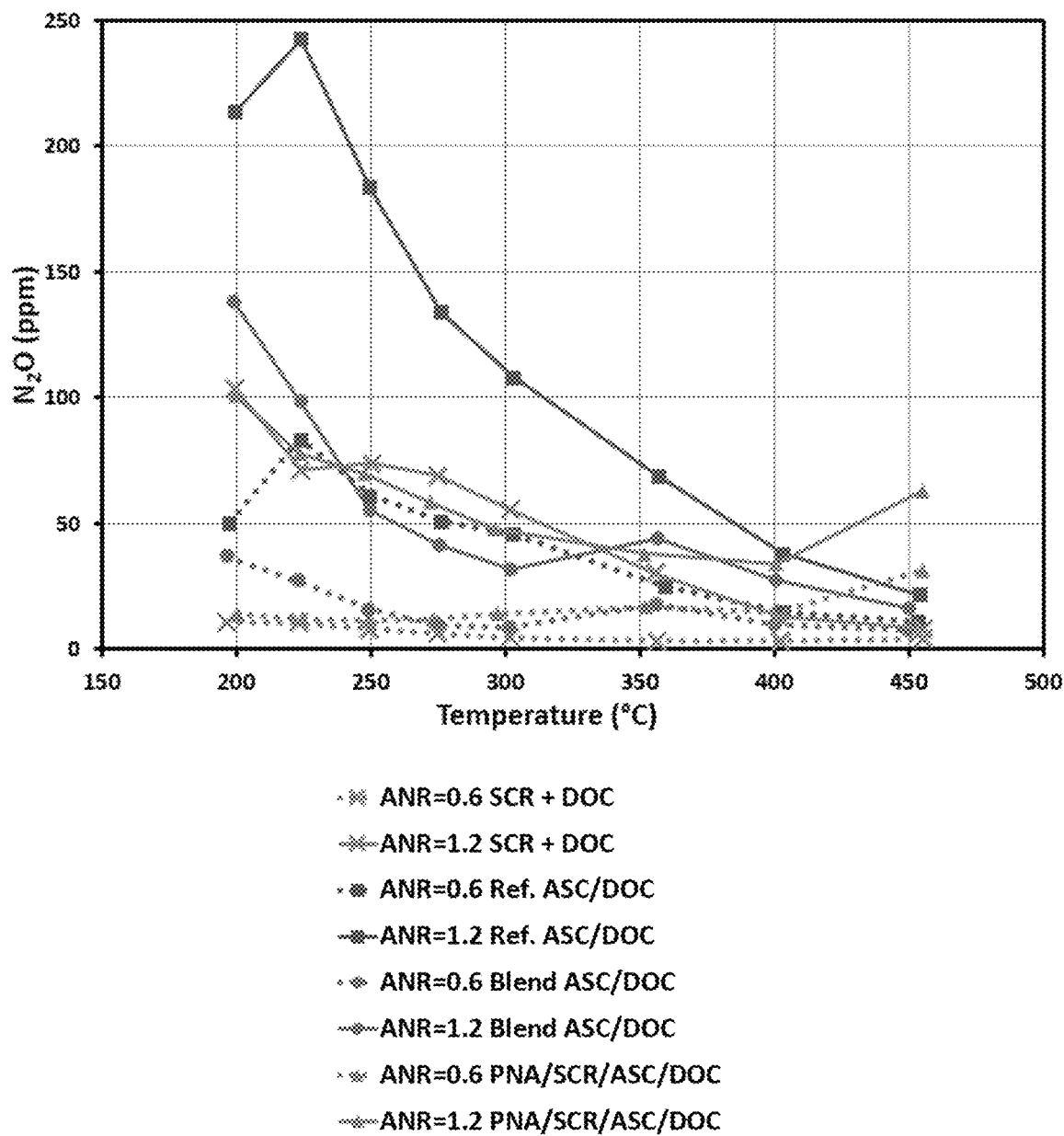
FIG. 50 shows $N_2O$ formation of inventive and reference catalysts.

Close-couple catalyst configurations were prepared with the following configurations: SCR/DOC, SCR-ASC/DOC and PNA/SCR-ASC/DOC. The specific configurations are shown in FIG. 45.

The SCR catalysts include Cu.zeolite. The blend ASC catalyst was prepared having a first zone with an SCR catalyst top layer of Cu on a zeolite, and a bottom layer with a blend of (1) platinum on a zeolite and (2) Cu on a zeolite; and a second zone with a DOC. A traditional ASC catalyst was prepared having a first zone with an SCR catalyst top layer of Cu on a zeolite, and a bottom layer with a platinum on a zeolite (and no SCR catalyst). Both catalysts were prepared with 3 g/ft$^3$ of Pt loading in the ASC zone. The DOC zone in the SCR/DOC and SCR-ASC/DOC configuration includes 3:1:0/20 PtPd.alumina. The DOC zone in the PNA/SCR-ASC/DOC configuration includes 3:1:0/40 PtPd.alumina. All catalysts were aged at 650° C./10% $H_2O$ in air/50 h.

The configurations were tested under simulated engine out conditions with ANR>1 and ANR<1. Specifically, the test conditions were as follows: 600 ppm or 1200 ppm $NH_3$, 1000 ppm NO, 500 ppm ($C_1$-based) $C_{10}H_{22}$, 200 ppm CO, 10% $O_2$, 4.5% $CO_2$, 4.5% $H_2O$, total 40,000 h$^{-1}$.

Results for NOx conversion, $N_2O$, $NH_3$ slip, HC conversion, and CO conversion are shown in FIGS. 46-50.

The SCR-ASC/DOC configuration with the traditional ASC produces most amount of $N_2O$ (FIG. 50) and has the lowest NO conversion (i.e. highest NO re-make) (FIG. 47) across the temperature window. When the traditional SCR-ASC in the SCR-ASC/DOC is replaced with SCR or blend SCR-ASC, both $N_2$ selectivity and NO conversion (FIG. 47) is significantly improved by reducing the unselective NO+$NH_3$ reaction on Pt.

A three zoned catalyst with PNA/SCR-ASC/DOC functionalities was tested to compare to the above references without PNA functionality. The PNA/SCR-ASC/DOC catalyst showed excellent $N_2$ selectivity and NO conversion (FIG. 47) that is comparable to SCR/DOC and SCR-ASC/DOC with the blend ASC, demonstrating that in the inventive catalyst, the addition of Pd.zeolite does not have negative effect on its SCR and ASC performance. The DOC performance of the PNA/SCR-ASC/DOC catalyst is slightly lower than the other references, mostly due to the shorter zone length, but is not expected to affect the total system performance as it can be easily compensated by a separate downstream DOC catalyst and/or a CSF catalyst.

Example 2

The aforementioned PNA/SCR-ASC/DOC catalyst was tested under simulated NOx storage-release conditions, where the catalyst was exposed to a simulated engine out gas mixture containing NOx at 80° C. for 100 seconds, followed by a temperature ramp to 500° C. Specifically, the test conditions were as follows: 200 ppm NO, 500 ppm ($C_1$-based) $C_{10}H_{22}$, 200 ppm CO, 10% $O_2$, 5% $CO_2$, 5% $H_2O$, with or without 300 ppm $NH_3$ injection at T≥180° C.; SV=40,000 $h^{-1}$. The catalysts were aged at 650° C./10% $H_2O$ in air/50 h.

Figure 51:
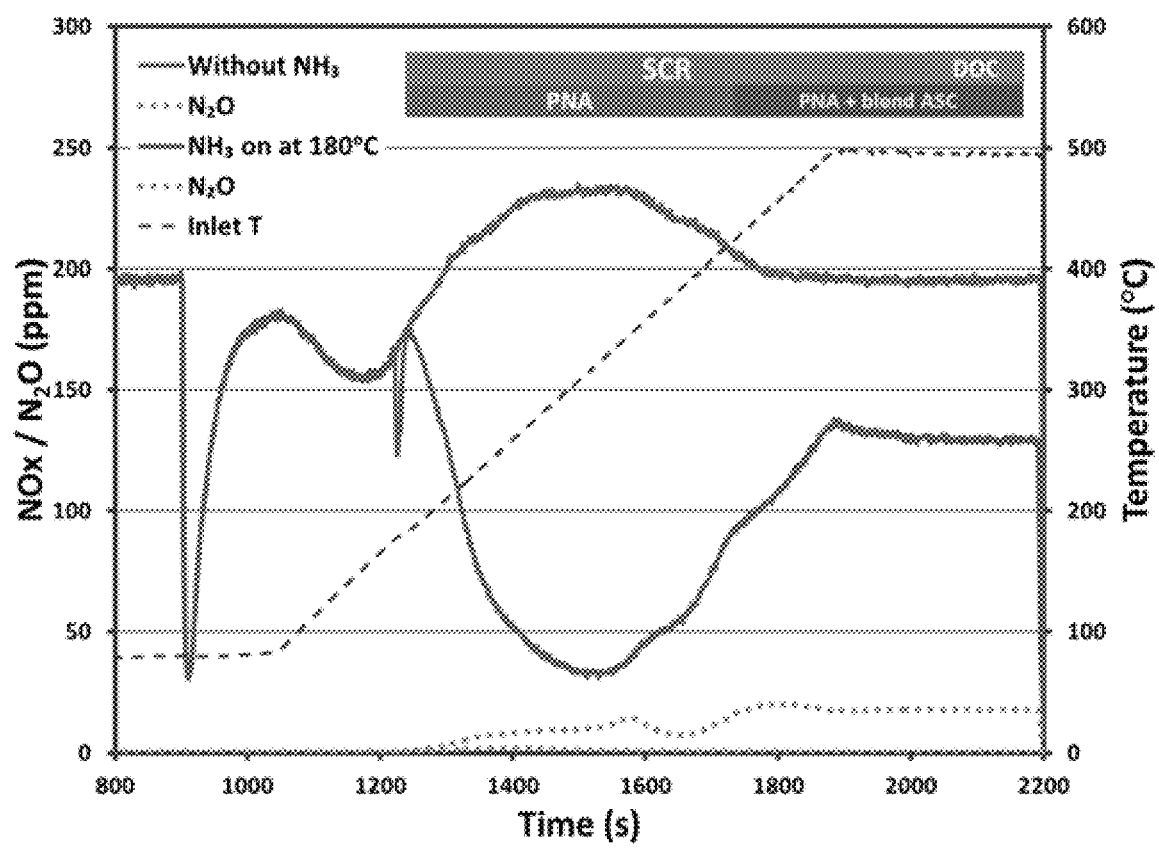
FIG. 51 shows NOx storage of an inventive catalyst.

As shown in FIG. 51, the catalyst provides significant NOx storage capacity during the "cold-start" period until the exhaust temperature reaches about 200° C. when NO release starts to occur. The test was then repeated under the same conditions except $NH_3$ was added to the feed once the temperature reaches 180° C.; this time, the catalyst still provides the same amount of NOx storage as in the first test, but the released NOx was converted through $NH_3$—SCR reaction on the catalyst instead of releasing to the reactor outlet.

These results demonstrate that the inventive catalyst provides excellent SCR and ASC functionalities while being able to store NOx during cold start period and convert released NOx at higher temperatures if $NH_3$ is provided in the feed. This invention essentially eliminates the temperature gap between NOx release temperature on the PNA catalyst and the necessary temperature for SCR reaction to be active in the downstream SCR catalyst in the PNA/DOC→filter→SCR/ASC system.

The invention claimed is:

1. A catalyst article comprising a substrate comprising an inlet end and an outlet end, a first zone, a second zone, and a third zone,
    wherein the first zone comprises a second SCR catalyst;
    wherein the second zone comprises an ammonia slip catalyst (ASC) comprising a blend of: (1) a platinum group metal on a support and (2) a first SCR catalyst;
    wherein the third zone comprises a catalyst ("third zone catalyst") selected from the group consisting of a diesel oxidation catalyst (DOC) and a diesel exotherm catalyst (DEC);
    wherein the first zone is located upstream of the second zone, and the second zone is located upstream of the third zone; and
    wherein the catalyst article comprises a passive NOx adsorber ("PNA").

2. The catalyst article of claim 1, wherein the first zone comprises the PNA.

3. The catalyst article of claim 1, wherein the second zone comprises the PNA.

4. The catalyst article of claim 1, wherein the catalyst article comprises a first layer, a second layer, and a third layer, further wherein:
    the ASC is included in the first layer;
    the third zone catalyst is included in the second layer, wherein the second layer extends from the outlet end to less than a total length of the substrate, where the second layer is located on top of the first layer and is shorter in length than the first layer; and
    the second SCR catalyst is included in the third layer, wherein the third layer extends from the inlet end to less than a total length of the substrate, and wherein the third layer at least partially overlaps the first layer.

5. The catalyst article of claim 4, wherein the first layer extends from the outlet end to less than a total length of the substrate.

6. The catalyst article of claim 4, wherein the first layer extends from the inlet end to less than the total length of the substrate.

7. The catalyst article of claim 4, wherein the first layer extends the total length of the substrate.

8. The catalyst article of claim 4, wherein the first layer covers a total length of the first zone and the second zone.

9. The catalyst article of claim 4, wherein the first layer further comprises the PNA.

10. The catalyst article of claim 9, wherein the first layer comprises a section comprising the PNA ("PNA section"), and the PNA section is located upstream of the blend.

11. The catalyst article of claim 4, wherein the first layer comprises a section comprising the PNA and a third SCR catalyst ("PNA/SCR section").

12. The catalyst article of claim 11, wherein the first layer comprises the PNA/SCR section and the blend, with the PNA/SCR layer located upstream of the blend.

13. The catalyst article of claim 11, wherein the first layer comprises the PNA/SCR section, with the blend located on top of the PNA/SCR section.

14. The catalyst article of claim 11, wherein the first layer comprises the blend, with the PNA/SCR section located on top of the blend.

15. The catalyst article of claim 1, wherein the blend further comprises the PNA.

16. The catalyst article of claim 1, wherein the support comprises a siliceous material selected from the group consisting of: (1) silica and (2) a zeolite with a silica-to-alumina ratio higher than 200.

17. The catalyst article of claim 1, wherein the platinum group metal is present on the support in an amount of about 0.5 wt % to about 10 wt % of the total weight of the platinum group metal and the support.

18. The catalyst article of claim 1, wherein, within the blend, a weight ratio of the first SCR catalyst to the platinum group metal on a support is about 10:1 to about 50:1.

19. The catalyst article of claim 1, wherein the first SCR catalyst and the PNA are present in a ratio of 5:1 to 1:5.

20. The catalyst article of claim 1, wherein the PNA comprises a platinum group metal on a molecular sieve.

21. The catalyst article of claim 1, wherein the PNA comprises Pd on a zeolite.

22. A method of reducing emissions from an exhaust stream, comprising contacting the exhaust stream with the catalyst article of claim 1.

23. The method of claim 22, wherein the exhaust stream comprises an ammonia:NOx ratio of ≥1 when a temperature of the exhaust stream entering the catalyst article is ≤180° C.

24. The method of claim 22, wherein the exhaust stream comprises an ammonia:NOx ratio of >0.5 when a temperature of the exhaust stream entering the catalyst article is ≤180° C.

* * * * *